(12) United States Patent
Yokota

(10) Patent No.: US 8,684,583 B2
(45) Date of Patent: Apr. 1, 2014

(54) LIGHTING DEVICE, DISPLAY DEVICE AND TELEVISION RECEIVER

(75) Inventor: Masashi Yokota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 402 days.

(21) Appl. No.: 13/147,417

(22) PCT Filed: Nov. 17, 2009

(86) PCT No.: PCT/JP2009/069469
§ 371 (c)(1),
(2), (4) Date: Aug. 2, 2011

(87) PCT Pub. No.: WO2010/089929
PCT Pub. Date: Aug. 12, 2010

(65) Prior Publication Data
US 2011/0285923 A1   Nov. 24, 2011

(30) Foreign Application Priority Data
Feb. 5, 2009 (JP) ................................ 2009-025061

(51) Int. Cl.
*F21V 7/04* (2006.01)

(52) U.S. Cl.
USPC ..................... 362/614; 362/97.2; 362/217.09; 362/618; 362/634

(58) Field of Classification Search
USPC .......... 362/97.2, 217.09, 614, 618, 634, 97.1, 362/97.4, 217.08, 632, 633; 349/64, 70
See application file for complete search history.

(56) References Cited

U.S. PATENT DOCUMENTS

| | | | | |
|---|---|---|---|---|
| 7,852,428 B2 * | 12/2010 | Byoun et al. | ..................... | 349/58 |
| 8,057,058 B2 * | 11/2011 | Cho | ............................. | 362/97.4 |
| 8,057,059 B2 * | 11/2011 | Yokota | ........................ | 362/97.4 |
| 2006/0279946 A1 * | 12/2006 | Park et al. | ....................... | 362/97 |
| 2007/0127272 A1 | 6/2007 | Yang et al. | | |
| 2007/0139911 A1 | 6/2007 | Yang et al. | | |
| 2007/0297062 A1 | 12/2007 | Park et al. | | |
| 2010/0124046 A1 | 5/2010 | Kuromizu | | |

FOREIGN PATENT DOCUMENTS

| | | |
|---|---|---|
| JP | 2007-033962 A | 2/2007 |
| JP | 2007-157450 A | 6/2007 |
| JP | 2007-157698 A | 6/2007 |
| JP | 2007-165320 A | 6/2007 |
| JP | 2007-200651 A | 8/2007 |
| WO | 2008/129724 A1 | 10/2008 |

OTHER PUBLICATIONS

Official Communication issued in International Patent Application No. PCT/JP2009/069469, mailed on Feb. 16, 2010.

* cited by examiner

*Primary Examiner* — John A Ward
(74) *Attorney, Agent, or Firm* — Keating & Bennett, LLP

(57) ABSTRACT

A backlight unit 12 includes a chassis 14, a plurality of cold cathode tubes 18, an optical member 16 and a plurality of support members 20. The chassis 14 has an opening on a light exit side. The cold cathode tubes 18 are light sources arranged in a parallel layout and housed in the chassis 14. The optical member 16 is arranged on the light exit side outer than the cold cathode tubes 18 so as to cover the opening of the chassis 14. The support members 20 are arranged in a parallel layout along a parallel arrangement direction of the cold cathode tubes 18. The support members 20 are formed such that support positions of the optical member 16 are relatively closer to the cold cathode tubes 18 around the center and relatively farther from the cold cathode tubes 18 near the edges. The cold cathode tubes 18 are arranged at relatively smaller intervals around the center and at relatively larger intervals near the edges.

28 Claims, 25 Drawing Sheets

FIG.1
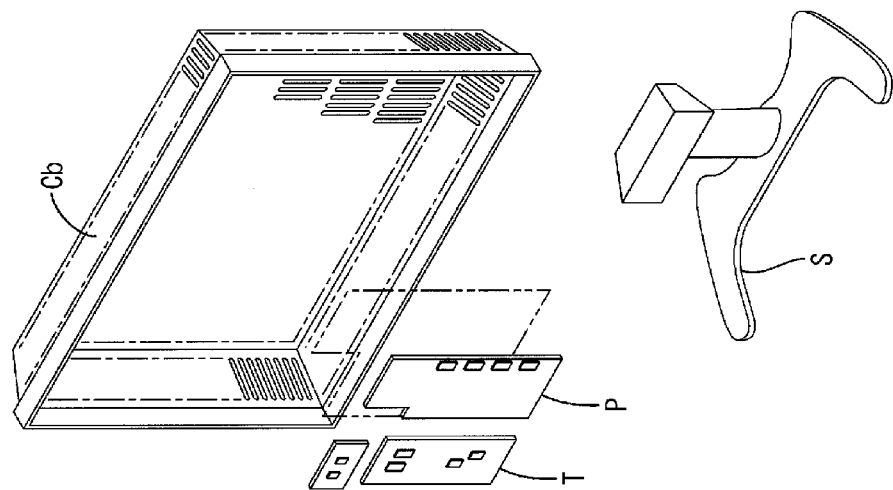
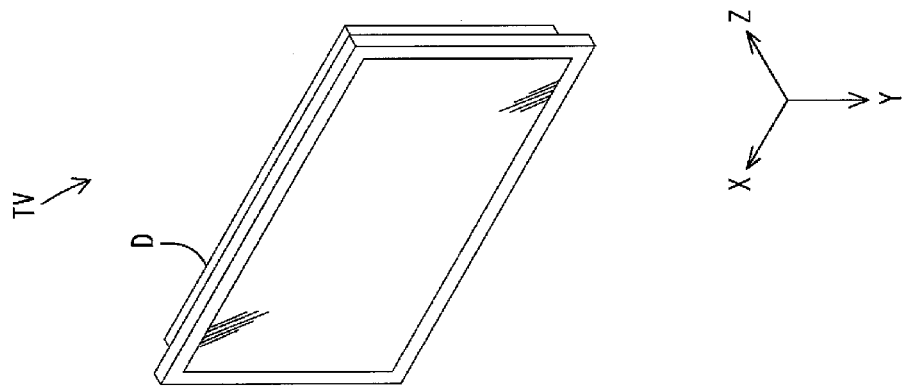
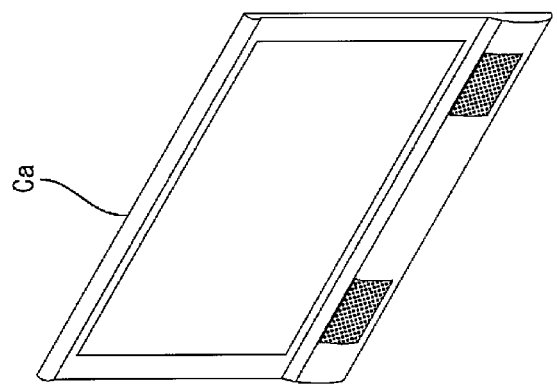

FIG.4
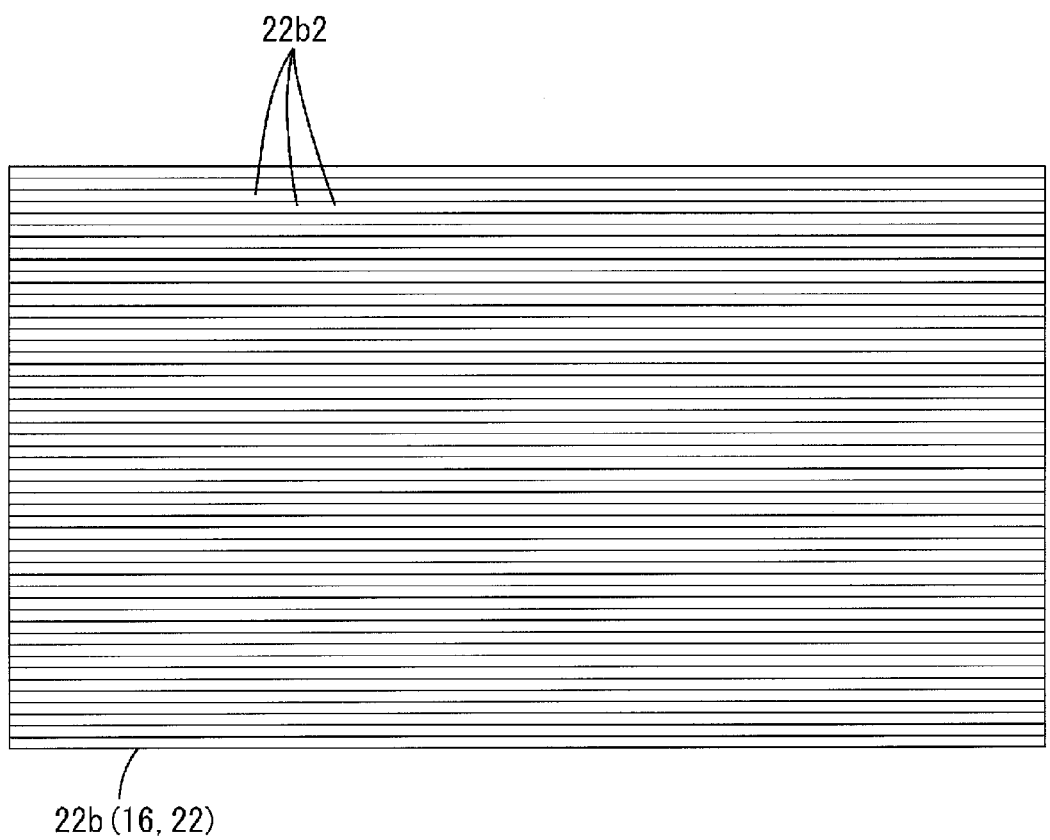
22b2
22b(16, 22)
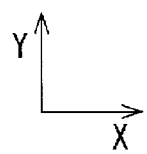

LIGHTING DEVICE, DISPLAY DEVICE AND TELEVISION RECEIVER

TECHNICAL FIELD

The present invention relates to a lighting device, a display device and a television receiver.

BACKGROUND ART

A liquid crystal display device includes a liquid crystal panel and a backlight unit that is arranged behind the liquid crystal panel. The backlight unit includes a chassis, a light source and an optical member. The chassis has an opening in a surface on a light exit side. The light source is housed in the chassis. The optical member is arranged so as to cover the opening of the chassis and configured to convert light emitted from the light source into planar light.

The optical member includes a diffuser. The diffuser includes a transparent base member in a predetermined thickness and a large number of diffusing particles are scattered in the base member. Outer edge areas of the diffuser are supported by support portions of the chassis. An area of the diffuser inner than the outer edge areas is supported by a support member mounted to the chassis.

An example of such a support member is disclosed in Patent Document 1. The diffuser is supported by support members. The support members include support pins that protrude toward the diffuser. A tip of each support pin is in a point contact with the area of the diffuser inner than the outer edge areas. The support members and the support pins are in a dispersed arrangement within a surface range of the diffuser.
Patent Document 1: Japanese Unexamined Patent Publication No. 2007-33962

Problem to be Solved by the Invention

The support pins disclosed in Patent Document 1 are in the dispersed arrangement within the surface range of the diffuser and provided with different heights for the following reason. When a cold cathode tube is turned on or off, an ambient temperature inside the backlight unit changes. As a result, the diffuser thermally expands or contract according to the change in the temperature. When the diffuser thermally expands, parts thereof around the support pins deform so as to corrugate with supporting points by the support pins as ridges. As a result, uneven brightness may occur. Therefore, the support pins of Patent Document 1 around the center are short and the support pins near the edges are tall such that the diffuser forms an arch. With this configuration, partial deformation of the diffuser is less likely to occur.

When the support pins around the center are shorter, the central part of the diffuser that forms an arch and the cold cathode tube is brought closer to the cold cathode tube. A shadow of the cold cathode tube (a lamp image) may be easily recognized through the optical member. Therefore, the support pins around the center require certain heights so that the central part of the diffuser that forms an arch is set at a sufficient distance away from the cold cathode tube. In that case, the support pins near the edges need to be unnecessarily tall and this increases the overall thickness of the backlight unit.

DISCLOSURE OF THE PRESENT INVENTION

The present invention was made in view of the foregoing circumstances. An object of the present invention is to reduce uneven brightness and a thickness of a lighting device.

Means for Solving the Problem

A lighting device of the present invention includes a chassis, a plurality of light sources, an optical member, a plurality of support members. The chassis has an opening on a light exit side. The light sources are arranged in a parallel layout and housed in the chassis. The optical member is arranged on a light exit side outer than the light sources so as to cover the opening of the chassis. The support members are arranged in a parallel layout along at least a parallel arrangement direction of the light sources. Each of the support members hold the optical member from a side opposite from the light exit side. The support members are arranged such that support positions of the optical member are relatively closer to the light sources around the center and relatively farther from the light sources near the edges. The light sources are arranged at relatively smaller intervals around the center and at relatively larger intervals near the edges.

With this configuration, the support positions of the optical member supported by the support members are relatively closer to the light sources around the center and relatively farther from the light sources near the edges. When the optical member is thermally expanded due to a change in temperature, the optical member is largely warped toward the light sources. Therefore, stresses applied to support points of the optical member supported by the support members can be reduced and thus parts of the optical member around the support points are less likely to be deformed. As a result, uneven brightness is less likely to occur.

When the optical member is warped toward the light sources as described above, distances between the light sources and the optical member around the center decrease. Therefore, shadows of the light sources are less likely to be recognized through the optical member. Because the light sources are arranged at relatively smaller intervals around the center and the distribution density of the light sources around the center is high, the shadows of the light sources are less likely to be recognized even when the distances between the optical member and the light sources around the center decrease. Therefore, the uneven brightness is less likely to occur. Namely, the support positions of the optical member supported by the support members can be set as close as possible to the light sources. Therefore, an overall thickness of the lighting device can be reduced.

BRIEF DESCRIPTION OF THE DRAWINGS

FIG. 1 is an exploded perspective view illustrating a general configuration of a television receiver according to the first embodiment of the present invention;
FIG. 4 is a plan view of a lens sheet.

BEST MODE FOR CARRYING OUT THE INVENTION

First Embodiment

Figure 2:
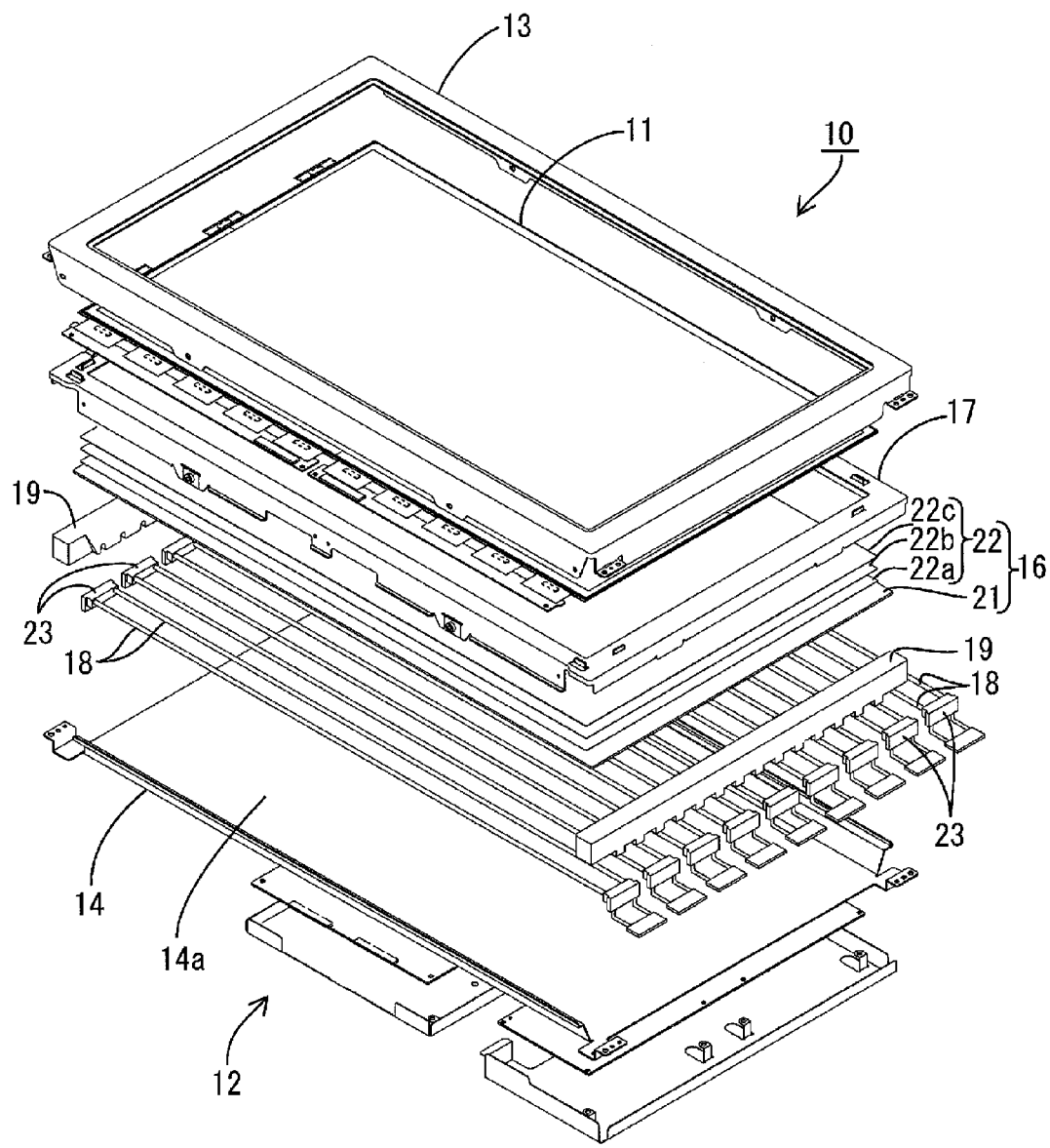
FIG. 2 is an exploded perspective view illustrating a general configuration of a liquid crystal display device included in the television receiver.

The first embodiment of the present invention will be explained with reference to FIGS. 1 to 14. In this embodiment, a liquid crystal display device 10 will be explained. X-axes, Y-axes and Z-axes are present in some drawings to indicate orientations of the liquid crystal display device 10. The Y-axes and the X-axes correspond to the vertical direction and the horizontal direction, respectively. In FIG. 2, the upper side and the lower side correspond to the front side and the rear side, respectively.

As illustrated in FIG. 1, the television receiver TV includes the liquid crystal display device 10 (a display device), a front cabinet Ca, a rear cabinet Cb, a power source P, and a tuner T. The cabinets Ca and Cb sandwich the liquid crystal display device 10 therebetween. The liquid crystal display device 10 is housed in the cabinets Ca and Cb. The liquid crystal display device 10 has a landscape rectangular overall shape. As illustrated in FIG. 2, the liquid crystal display device 10 includes a liquid crystal panel 11, which is a display panel 11, and a backlight unit 12 (a lighting device), which is an external light source. The liquid crystal panel 11 and the backlight unit 12 are held together by a frame-shaped bezel 13.

As illustrated in FIG. 2, the liquid crystal panel 11 of the liquid crystal display device 10 has a rectangular plan-view shape. It includes a pair of transparent glass substrates (having high light transmissivity) bonded together with a predetermined gap therebetween and a liquid crystal layer (not shown) sealed between the glass substrates. On one of the glass substrates, switching components (e.g., TFTs), pixel electrodes and an alignment film are arranged. The switching components are connected to source lines and gate lines that are perpendicular to each other. The pixel electrodes are connected to the switching components. On the other glass substrate, color filter having color sections of three primary colors of red (R), green (G) and blue (B) arranged in a predetermined arrangement, counter electrodes and an alignment film are arranged. Image data and various kinds of control signals for displaying images are feed from a drive circuit board, which is not shown, to the source lines, the gate lines and the counter electrode. Polarizing plates are arranged on outer surfaces of the glass substrates, respectively.

Figure 3:
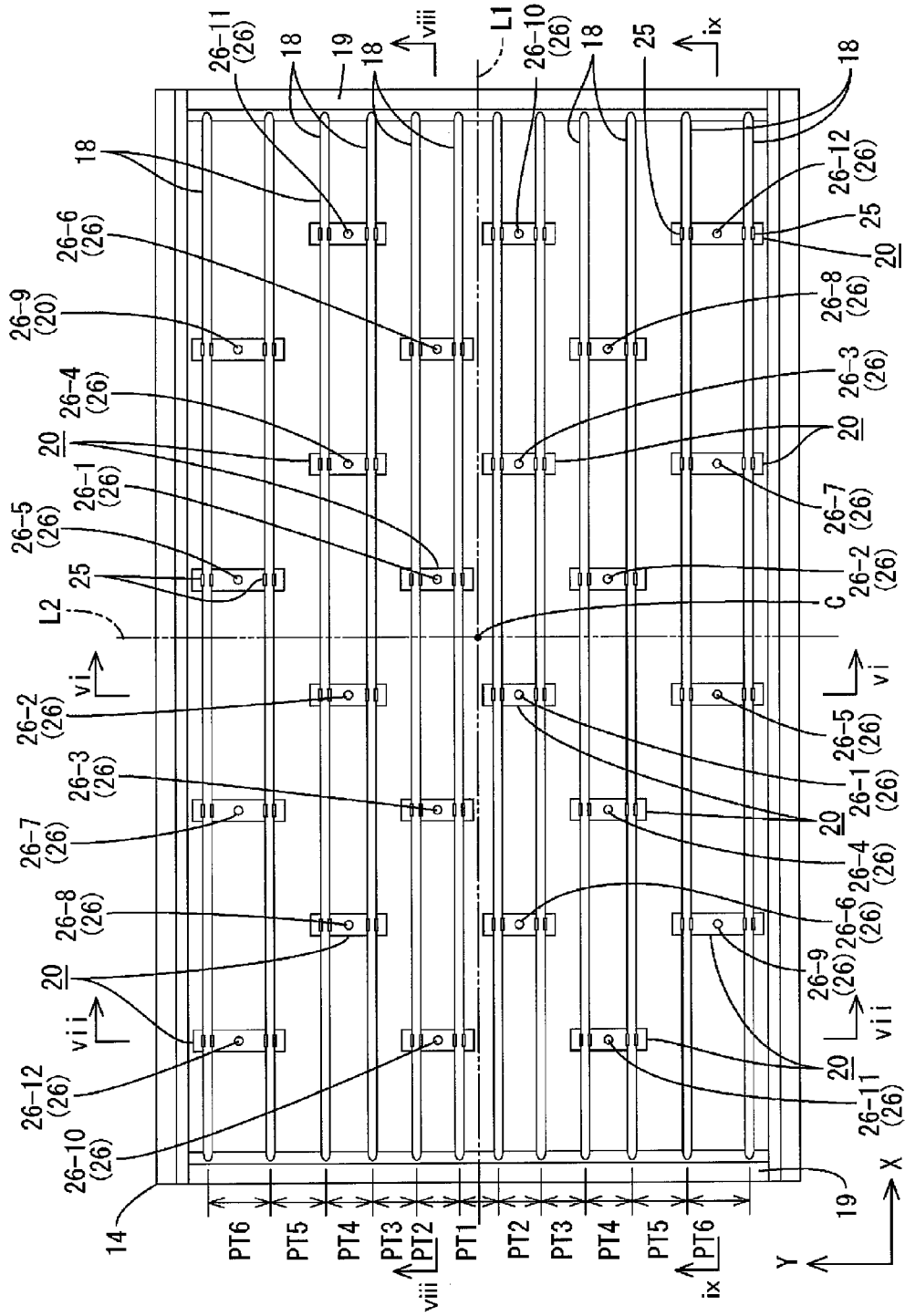
FIG. 3 is a plan view of a backlight unit.

Next, the backlight unit 12 of the liquid crystal display device 10 will be explained. As illustrated in FIG. 2, the backlight unit 12 is a so-called direct backlight including light sources that are arranged directly behind the liquid crystal panel 11. The backlight unit 12 includes a chassis 14, a reflection sheet 15, multiple layers of the optical member 16, a frame 17, a plurality of cold cathode tubes (linear light sources), and holders 19. The chassis 14 has a box-like overall shape and an opening on the front side (the light exit side, the liquid crystal panel 11 side). The reflection sheet 15 is placed inside the chassis 14. The optical member 16 are arranged so as to cover the opening. The frame 17 holds the optical member 16 from the front side. The cold cathode tubes 18 are arranged parallel to each other and housed in the chassis 14. The holders 19 cover the respective ends of the cold cathode tubes 18 so as to block light. Each holder 19 has light reflectivity. As illustrated in FIG. 3, the backlight unit 12 further includes a plurality of support members 20 having light-source holders 25 and support pins 26. Each light-source holder 25 holds the middle portion of each cold cathode tube 18. The support pin 26 supports the optical member from the rear side.

The chassis 14 is made of metal, for instance, aluminum. As illustrated in FIG. 2, the chassis 14 includes a bottom plate 14a and side plates 14a. The bottom plate has a rectangular plan-view shape similar to the liquid crystal panel 11. The side plates 14a rise from the outer edges of the bottom plate 14a. The long-side direction and the short-side direction of the bottom plate 14a are aligned with the X-axis direction and the Y-axis direction indicated in the drawings, respectively. The reflection sheet 15 is made of white synthetic resin having high light reflectivity. It is placed over the inner surface of the chassis 14 so as to cover substantially an entire area. Moreover, it is configured to reflect rays of light from the cold cathode tubes 18 toward the optical member 16 (the light exit side).

The optical member 16 has a rectangular shape similar to the bottom plate 14a of the chassis 14 or the liquid crystal panel 11. It is made of synthetic resin having light transmissivity. The optical member 16 is arranged in front of the cold cathode tubes 18 and behind the liquid crystal panel 11. Namely, the optical member 16 is arranged between the cold cathode tubes 18 and the liquid crystal panel 11. Linear light from the cold cathode tubes 18 passes through the optical member in a travel path to the liquid crystal panel 11. The light is converted into planar light.

The optical member 16 includes a diffuser 21 and a plurality of optical sheets 22. The diffuser 21 is arranged at the rearmost so as to face the cold cathode tubes 18 and the support members 20. The optical sheets 22 are layered and arranged on the front side of the diffuser 21. The diffuser 21 includes a base member made of synthetic resin (e.g., polystyrene) and having a predetermined thickness (e.g., 1.5 mm to 2 mm). A large number of diffusing particles for diffusing light are scattered in the base member. A softening temperature of the diffuser 21 is around 80° C. Each optical sheet 22 is thinner than the diffuser 21. Three different kinds of optical sheets are provides. They are a diffusing sheet 22a, a lens sheet 22b and a reflection-type polarizing plate 22c layered in this order from the diffuser 21 side (from the rear side).

Figure 5:
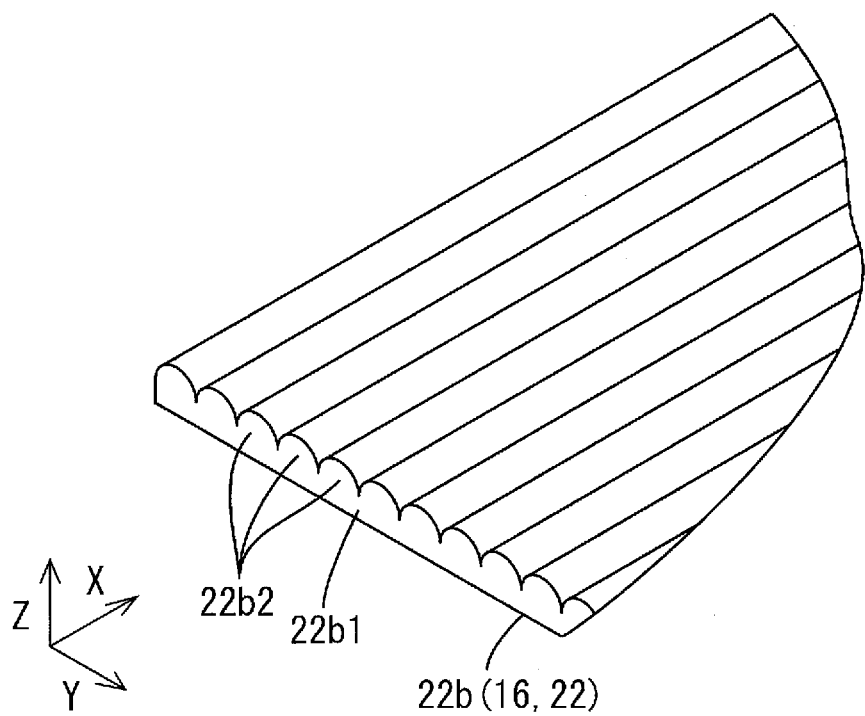
FIG. 5 is a magnified perspective view of the lens sheet.

The lens sheet 22b of the optical sheets 22 between the diffusing sheet 22a and the reflection-type polarizing plate 22c is a so-called lenticular lens sheet. As illustrated in FIGS. 4 and 5, a large number of convex cylindrical lenses 22b2 are arranged on a surface of a base member 22b1. The cylindrical lenses 22b2 are light-collecting structures. The lens sheet 22b has anisotropic light-collecting properties. Each cylindrical lens 22b2 has a curved light exit surface and a semi-oval cross section. The cylindrical lenses 22b2 are arranged so as to extend in a long-side direction of the lens sheet 22b and parallel to each other in a direction perpendicular to the extending direction (the axial direction) thereof, that is, in a short-side direction of the lens sheet 22b. A light-collecting direction and a non-light-collecting direction of each cylindrical lens 22b2 are aligned with the short-side direction (the Y-axis direction, the vertical direction) and the long-side direction (the X-axis direction, the horizontal direction) of the lens sheet 22b, respectively.

As illustrated in FIG. 2, the frame 17 is formed in a frame shape along the outer edges of the liquid crystal panel 11 and the optical member 16. The frame 17 is arranged in front of the optical member 16. The outer edges of the optical member 16 are sandwiched between the frame 17 and the holders 19. The frame 17 supports the liquid crystal panel 11 from the rear side (a side opposite from the light exit side or the liquid crystal panel 11). The liquid crystal panel 11 is sandwiched between the frame 17 and the bezel 13 that is arranged in front of the liquid crystal panel 11. The bezel 13 is made of metal and formed in a frame shape along the outer edges of the liquid crystal panel 11 similar to the frame 17. It holds the outer edges (non-display areas, frame portion) of the liquid crystal panel 11 from the front side.

The cold cathode tubes 18 are one kind of linear light sources (tubular light sources) that linearly extend in one direction. The cold cathode tubes 18 are mounted inside the chassis 14 with the axial direction thereof (the X-axis direction) matches the long-side direction of the chassis 14. Twelve of them are arranged such that the axes thereof are substantially parallel to each other and a predetermined distance away from each other in the short side direction of the chassis 14 (the Y-axis direction). Namely, the cold cathode tubes 18 are housed in the chassis 14 with their axial directions aligned with the horizontal direction and their arrangement direction along the vertical direction. The cold cathode tubes 18 are housed in the chassis 14 with their axial directions aligned with the non-light collecting direction of the lens sheet 22b and their arrangement direction along the light-collecting direction of the lens sheet 22b (see FIG. 4). Furthermore, rubber holders 23 are fitted onto ends of each cold cathode tube 18.

Each holder 19 is made of white synthetic resin having high light reflectivity. It extends along the short side of the chassis 14 and has a box-like shape with an opening on the rear side. The holders 19 are attached to the respective ends of the long side of the chassis 14 so as to collectively cover the respective ends of the cold cathode tubes 18 (non-light-emitting portions) arranged at the ends in a parallel layout. A part of the front surface of the holder 19 close to the inner edge is stepped and the outer short-side edge of the optical member 16 is placed on the stepped part. Therefore, the optical member 16 is sandwiched between the holders 19 and the frame 17.

Each support member 20 is made of white synthetic resin (e.g., polycarbonate) having high light reflectivity. As illustrated in FIG. 3, the support members 20 are arranged in a two-dimensionally dispersed layout with a predetermined distribution within the surface range of the bottom plate 14a of the chassis 14. Twenty-four support members 20 are arranged on the bottom plate 14a in a zigzag (or staggered) layout. Four of them are arranged in a line along the long-side direction of the bottom plate 14a and thus four lines of them are present along the long-side direction. Three of them are arranged in a ling along the short-side direction of the bottom plate 14a and thus eight lines of them are present along the short-side direction. By arranging the support members 20 in the zigzag layout, the shadows of the support members 20 are less likely to be recognized through the optical member 16. The support members 20 are arranged symmetrical with respect to the center C of the bottom plate 14a of the chassis 14 or the optical member 16. The arrangement intervals between the support members in rows (in the long-side direction of the chassis, the X-axis direction) are substantially equal. A distance between the adjacent support members 20 in a row is substantially the same for all support members 20. Each cold cathode tube 18 is held by the support members 20 in a row at four points away from each other in the axial direction of the cold cathode tube 18.

Figure 6:
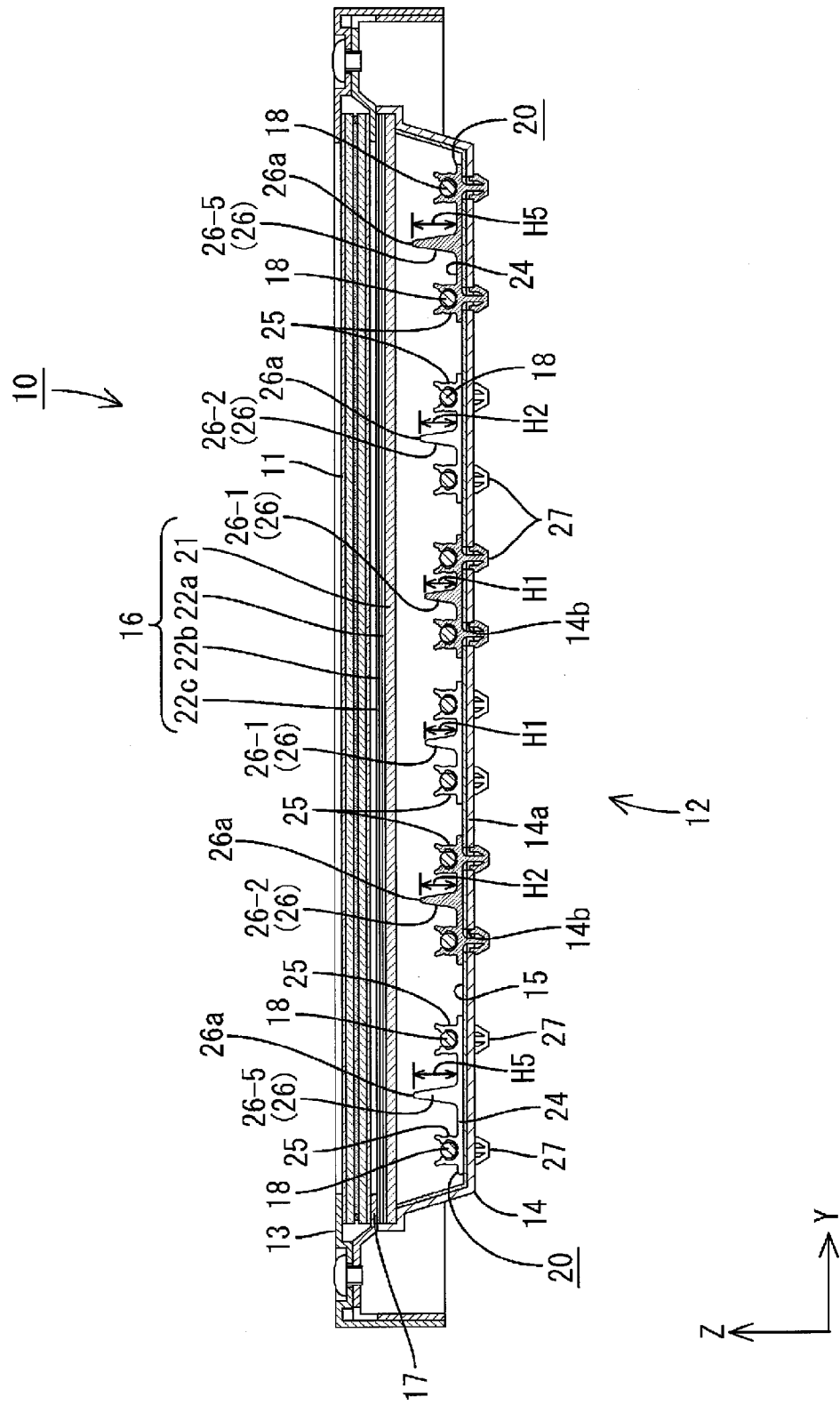
FIG. 6 is a cross-sectional view along line vi-vi in FIG. 3 with an optical member before thermal expanded.

Each support member 20 includes a main body 24 in a plate-like shape that extends along the bottom plate 14a of the chassis 14. The main body 24 has a substantially rectangular plan-view shape. It is mounted to the bottom plate 14a with the long-side direction and the short-side direction thereof aligned with the arrangement direction of the cold cathode tubes 18 (the short-side direction of the chassis 14, the Y-axis direction) and the axial direction of the cold cathode tube 18 (the long-side direction of the chassis 14, the X-axis direction), respectively. As illustrated in FIG. 6, the light-source holders 25 and the support pin 26 are provided on the front surface of the main body 24 (the surface facing the cold cathode tube 18 and the optical member 16). Moreover, a mounting part 27 for mounting the support member 20 to the chassis 14 is provided on the rear surface of the main body 24 (the surface facing the bottom plate 14a of the chassis 14).

Two light-source holders 25 are arranged away from each other in the long-side direction of the main body 24. The light-source holders 25 hold the different cold cathode tubes 18. With the cold cathode tubes 18 held by the light-source holders 25, the positional relationship between each cold cathode tube 18 and the bottom plate 14a of the chassis 14 in the Z-axis direction is determined. Furthermore, a distance between each cold cathode tube 18 and the bottom plate 14a remains constant. Each light-source holder 25 includes a pair of cantilever-shaped arms that rise from the main body 24 to the front side. The cold cathode tube 18 is held between the arms with elastic forces. The distance between the light holders 25 adjacent to each other in the Y-axis direction is equal to the distance between the cold cathode tubes 18 adjacent to each other in the arrangement direction in which the cold cathode tubes 18 are arranged inside the chassis 14 (see FIG. 3).

The support pin 26 is provided on the main body 24 between the light-source holders 25. Specifically, the support pin 26 is located around the center of the main body 24 (the midpoint of the long side and the short side) and a midpoint between the light-source holders 25. Namely, a distance between the support pin 26 and one of the light-source holder 25 is substantially equal to a distance between the support pin 26 and the other light-source holder 25. The support pin 26 has a cone-like shape with a diameter that decreases toward the tip and a height that measuring from the main body 24 larger than that of the light-source holders 25. The tip 26a of the support pin 26 is in contact with the rear surface of the diffuser 21 of the optical member 16. As a result, the diffuser 21 is separated from the cold cathode tubes 18 to the front side and held at a position so as not to touch the cold cathode tubes 18. A distance in the Z-axis direction (the direction perpendicular to the plate surface of the optical member 16) between the optical member 16 and each cold cathode tube 18 is defined. The distance between the optical member 16 and each cold cathode tube 18 is maintained larger than a predetermined distance. Namely, the distance between the optical member 16 and each cold cathode tube 18 is less likely to decrease under a predetermined distance. At positions where the tips of the support pins 26 are located are support positions where the optical member 16 is supported. The support pins 26 project the farthest to the front side among the parts of the support members 20. Therefore, when the support members 20 are attached to or removed from the chassis 14, a person working thereon can use the support pins 26 as holding portions, that is, the person can hold the support pins 26 during the attachment or the removal.

A pair of the mounting parts 27 is provided on the rear surface of each main body 24. The mounting parts 27 are located in areas that overlap the respective light-source holders 25 in plan view. Each mounting part 27 includes a main portion and a pair of stoppers. The main portion protrudes from the main body 24 to the rear side. Each stopper protrudes backward from a distal end of the main portion. The mounting parts 27 are inserted in mounting holes 14b formed in the bottom plate 14a of the chassis 14. During the insertion, both stoppers of each mounting part 27 elastically deform temporarily. When the mounting part 27 reaches the farthest insertion position, the stoppers return to the original shapes and the tips thereof are held against the edges of the respective mounting hole 14b from the rear side. As a result, the support member 20 is held in a proper mount condition.

In this embodiment, the support positions of the optical member 16 supported by the support members 20 and the layout of the cold cathode tubes 18 are unique. First, the support positions of the optical member 16 supported by the support members 20 will be explained. As illustrated in FIG. 3, the support members 20 are arranged in a two-dimensionally dispersed layout within the surface range of the bottom plate 14a of the chassis 14. The support pins 26 protrude from the respective main bodies 24 in different lengths and thus the support pins 26 support the optical member 16 at different positions. The support pins 26 around the center of the bottom plate 14a are relatively shorter and those near outer edges are relatively higher. As illustrated in FIGS. 6 to 9, the Z-axis positions of the tips 26a of the support pins 26 gradually become higher from the center of the bottom plate 14a or the optical member 16 to the outer edges. Namely, the Z-axis positions gradually become lower from the outer edges to the center. Differences in heights of the support pins 26 from the main bodies 24 to the tips are proportional to differences in distances from the center C of the bottom plate 14a or the optical member 16 (see FIG. 3). A line that connects the tips 26a of the support pins 26 forms an arc-like shape that curves toward the rear (see FIGS. 6 to 9). The support positions of the optical member 16 supported by the support pins 26, the tips 26a of which are located at high levels, are away from the cold cathode tubes 18 (i.e., distances to the cold cathode tubes 18 are long). The support positions of the optical member 16 supported by the support pins 26, the tips 26a of which are located at low levels, are close to the cold cathode tubes 18 (i.e., distances to the cold cathode tubes 18 are short). Setting the support positions of the optical member to low is preferable for reducing the overall thickness. However, the shadows of the cold cathode tubes 18, that is, lamp images are more likely to recognized from the front via the optical member 16. As a result, the uneven brightness is more likely to occur.

In FIGS. 3 and 6 to 9, the support pins 26 are marked with symbols H1 to H12 that indicate the heights thereof in a sequence from the shortest one to the longest one. Furthermore, to distinguish the support pins 26 from one another, the support pins 26 are marked with −1 to −12 in a sequence from the one that supports the optical member at the lowest position (the closest one to the center) to the one that supports the optical member at the highest position (the furthest from the center).

Figure 7:
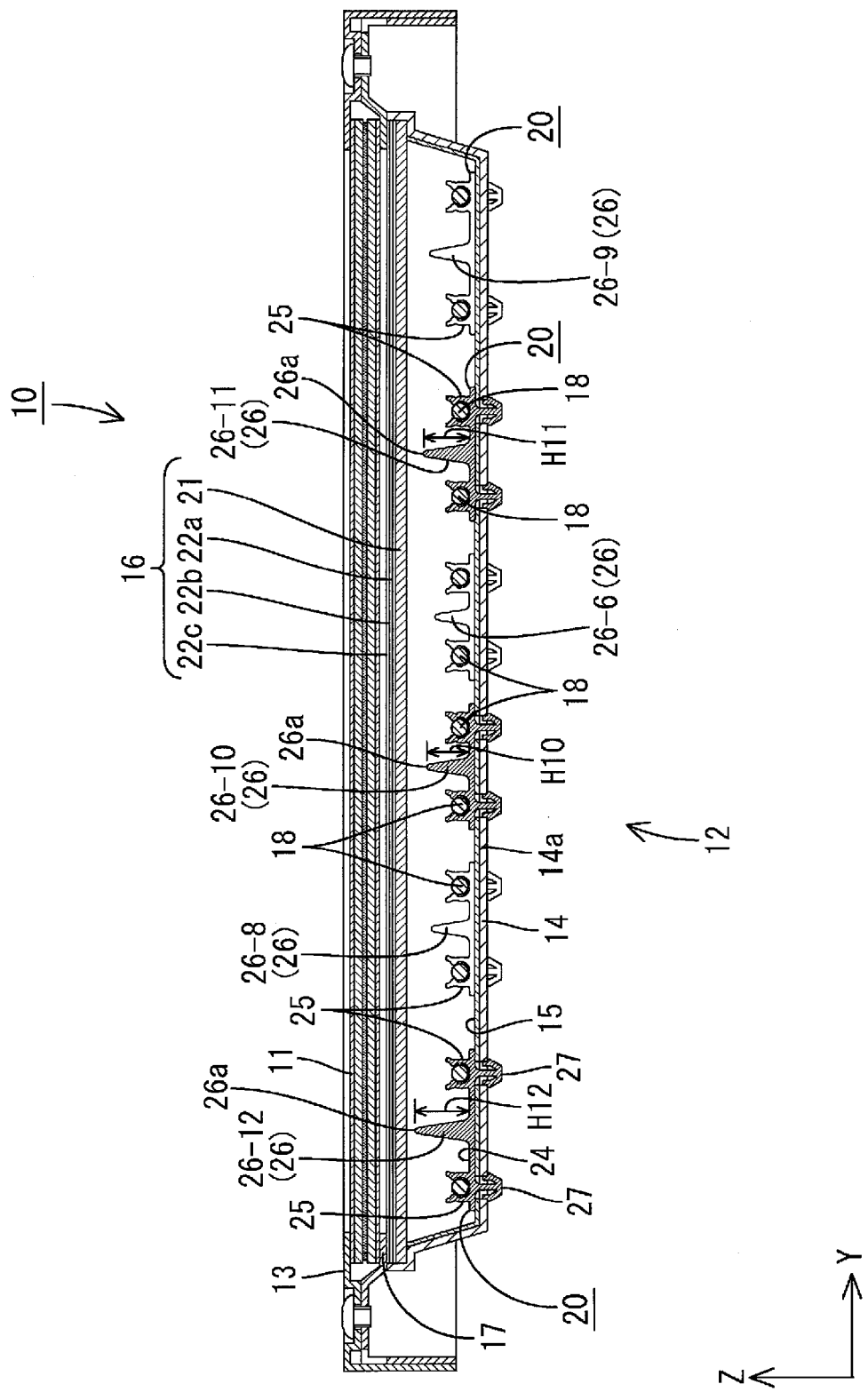
FIG. 7 is a cross-sectional view along line vii-vii in FIG. 3 with the optical member before thermal expanded.
Figure 8:
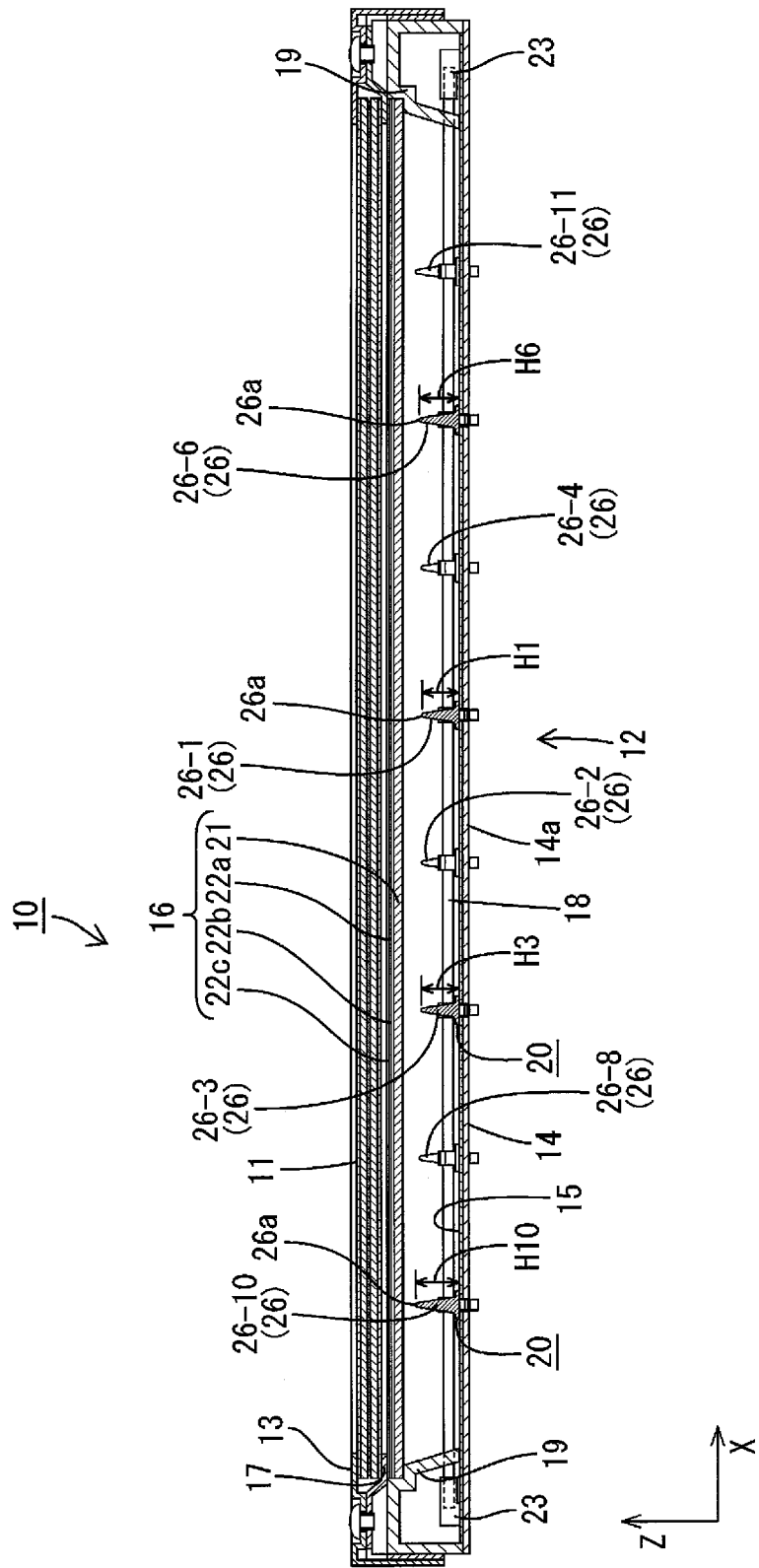
FIG. 8 is a cross-sectional view along line viii-viii in FIG. 3 with the optical member before thermal expanded.
Figure 9:
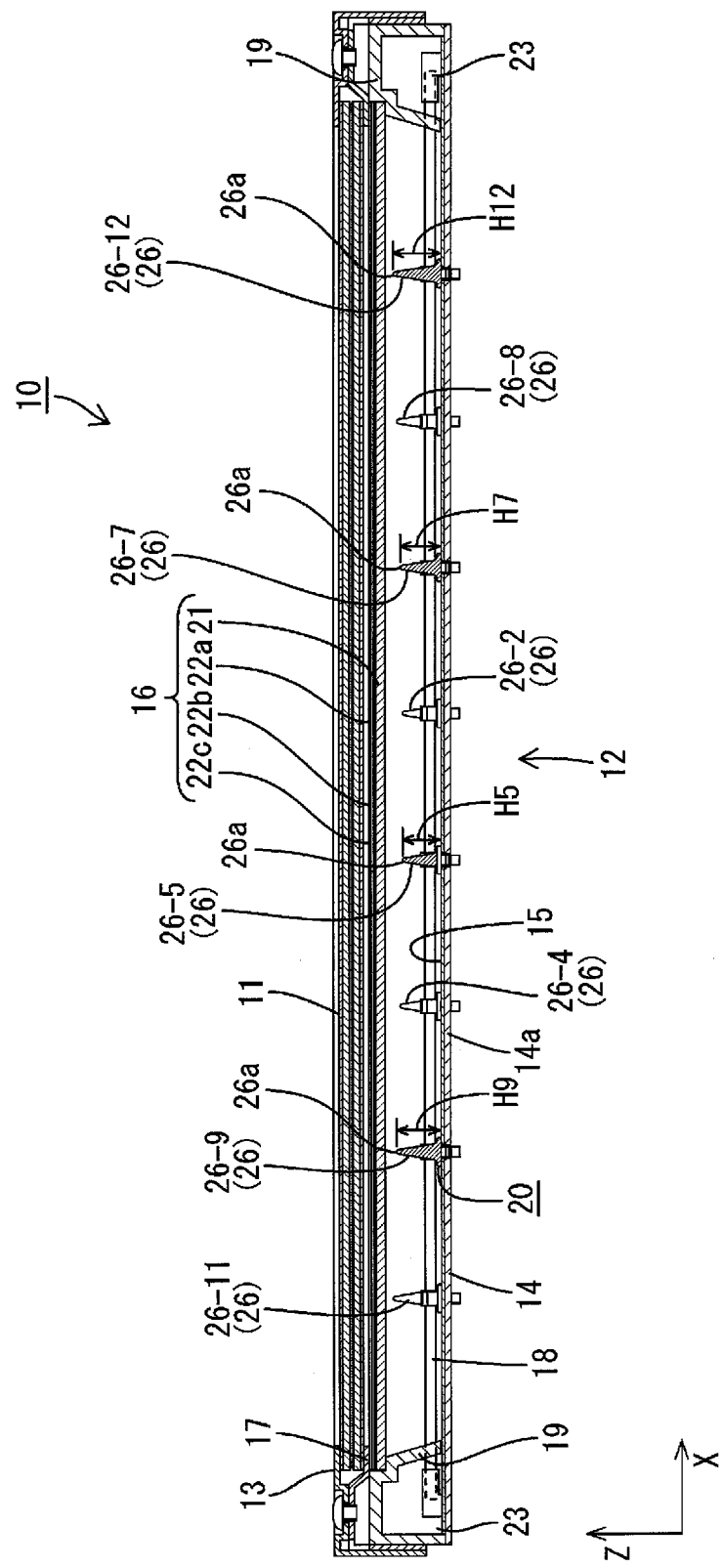
FIG. 9 is a cross-sectional view along line ix-ix in FIG. 3 with the optical member before thermal expanded.
Figure 10:
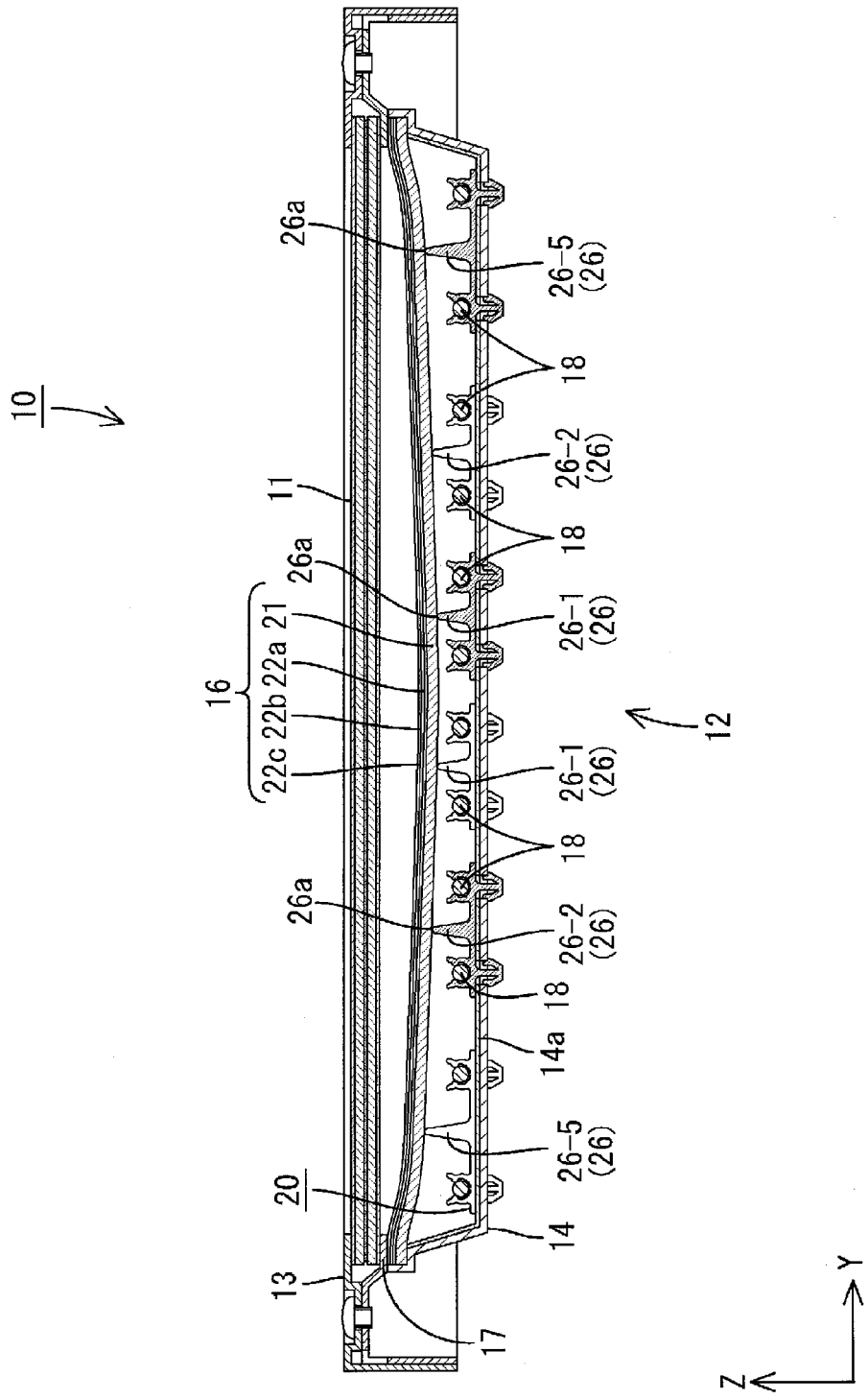
FIG. 10 is a cross-sectional view along line vi-vi in FIG. 3 with a thermally expanded optical member.
Figure 11:
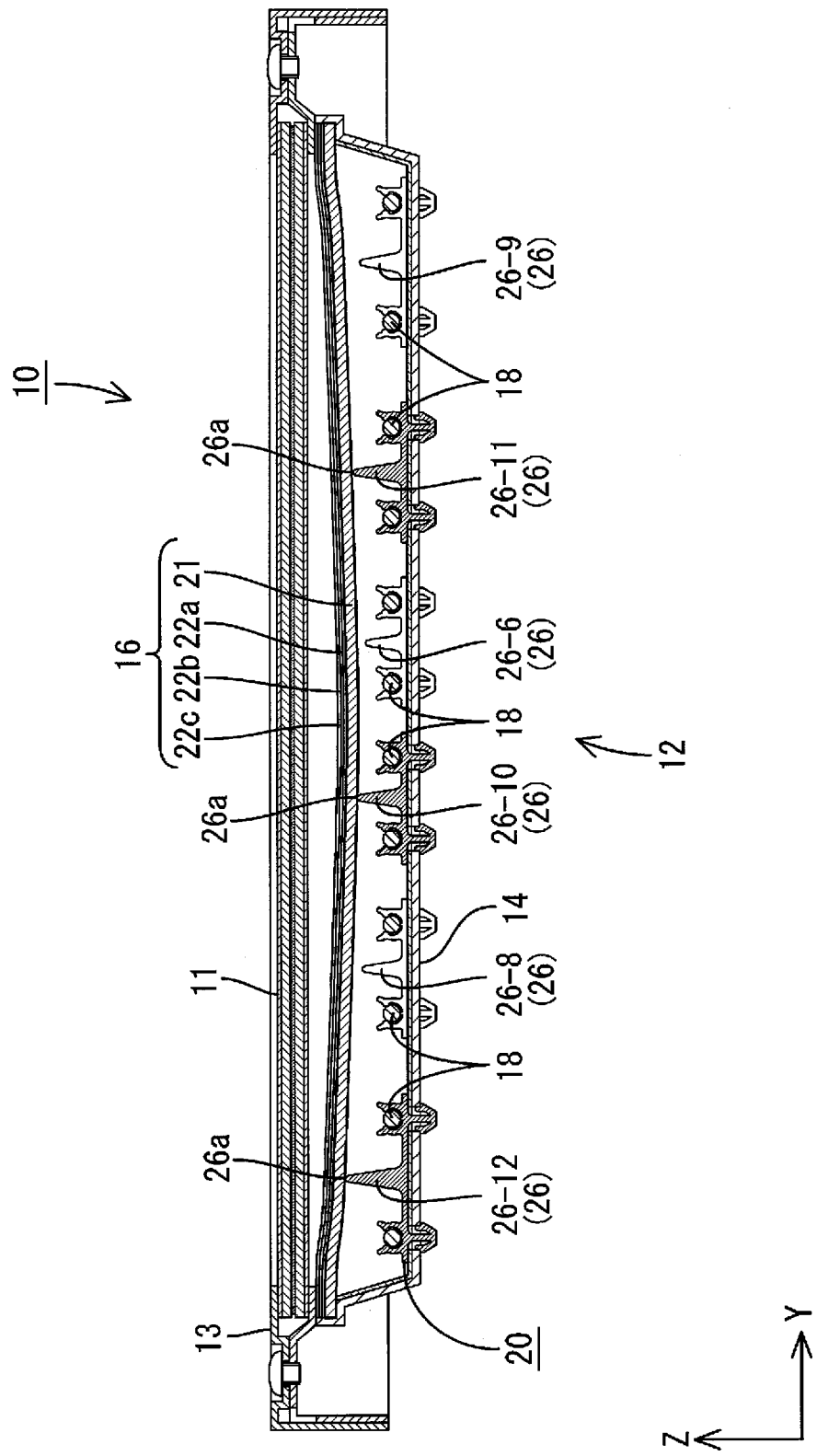
FIG. 11 is a cross-sectional view along line vii-vii in FIG. 3 with the thermally expanded optical member.
Figure 12:
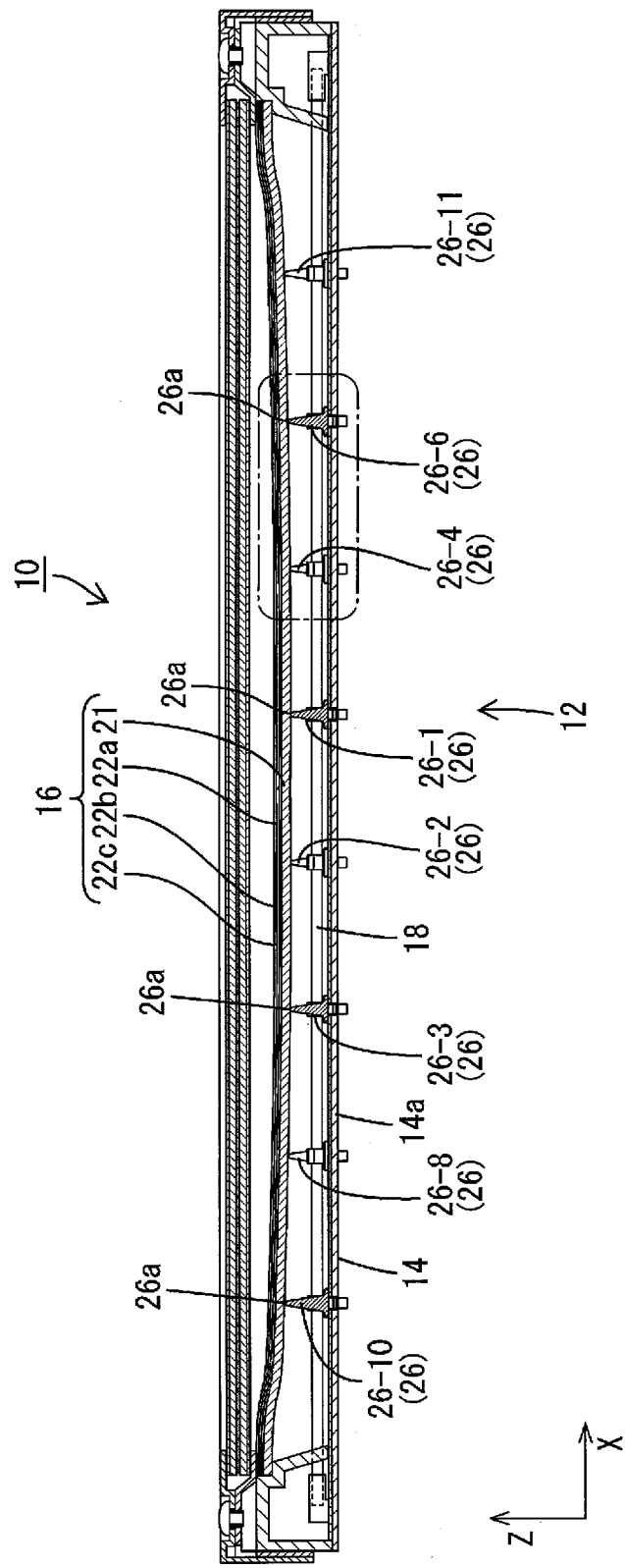
FIG. 12 is a cross-sectional view along line viii-viii in FIG. 3 with the thermally expanded optical member.
Figure 13:
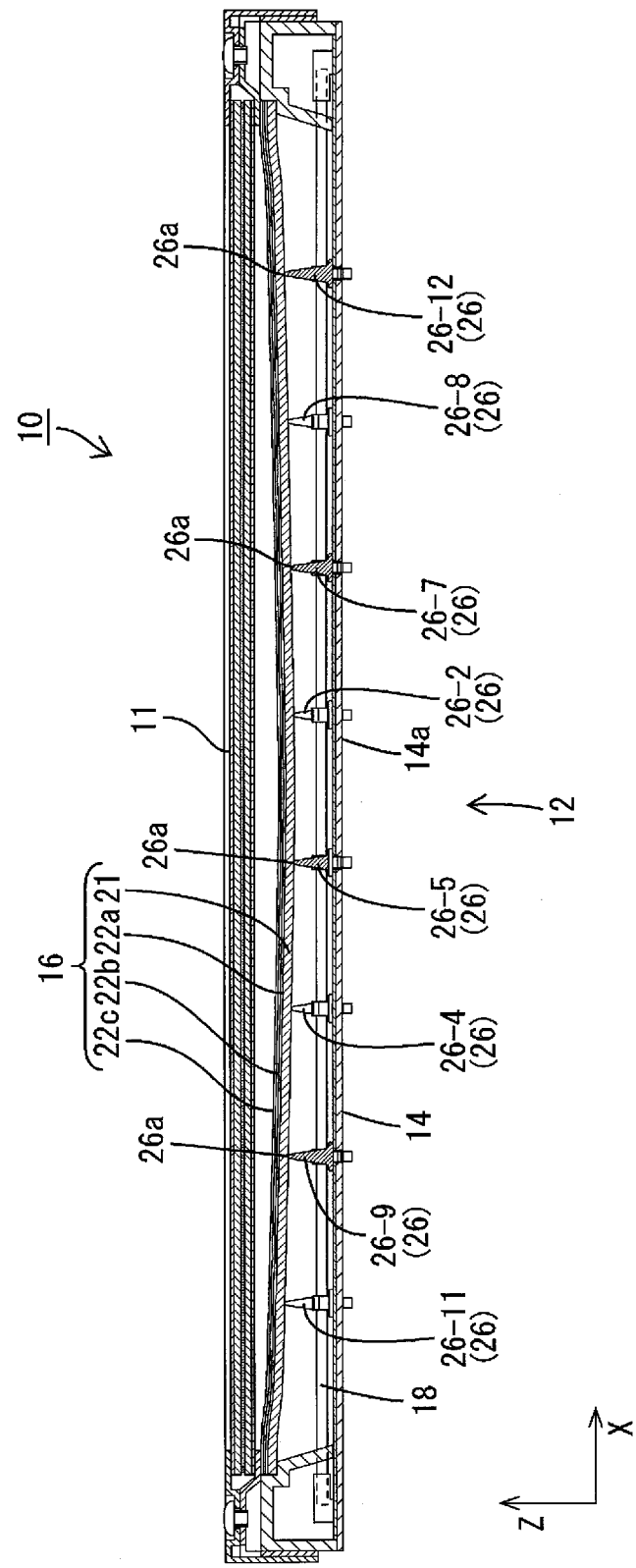
FIG. 13 is a cross-sectional view along line ix-ix in FIG. 3 with the thermally expanded optical member.

In FIG. 3, line L1 and line L2 extend in the X-axis direction and the Y-axis direction, respectively, and pass the center C. The support pins 26 of the support members 20 in a specific line (arranged in the Y-axis direction) among those in a matrix are formed such that the ones closer to line L1 support the optical member 16 at lower positions and ones away from line L1 supports the optical member 16 at higher positions. The support pins 26 of the support members in another specific line (arranged in the X-axis direction) are formed such that the support pins 26 closer to line L2 support the optical member 16 at lower positions and ones away from line L2 supports the optical member 16 at higher positions. As illustrated in FIG. 7, the support pin 26-12 that supports the optical member 16 at the highest position has a height such that it does not reach the rear surface of the diffuser 21 that is substantially flat along the X-Y plane without deformation due to heat, that is, it is not in contact with the rear surface. Therefore, a gap is present between the tips 26a of the support pins 26 of the support members 20 and the flat diffuser 21. A warp of the diffuser 21 is allowed within the gap. Because the gap is large around the center of the diffuser 21 and smaller near the outer edges of the diffuser 21, the warp of the diffuser 21 toward the rear side is allowed.

Next, the arrangement of the cold cathode tubes 18 will be explained. As illustrated in FIG. 3, the cold cathode tubes 18 are arranged in the Y-axis direction in the parallel layout with different intervals according to the locations. The intervals are relatively small around the center of the bottom plate 14a of the chassis 14 or the optical member 16 and relatively large near the ends of the Y-axis dimension. Namely, the cold cathode tubes 18 are arranged at irregular intervals that gradually change. The intervals between the cold cathode tubes 18 gradually become larger from the center of the bottom plate 14a toward the ends of the Y-axis dimension. Namely, the intervals gradually become smaller from the ends of the Y-axis dimension toward the center of the bottom plate 14a. The intervals between the cold cathode tubes 18 change proportional to the distance from the center C of the bottom plate 14a or the optical member 16. The cold cathode tubes 18 are arranged symmetric with respect to the line L1 that extends in the X-axis direction and passes the center C. When the cold cathode tubes 18 are arranged at small intervals, the distribution density of the cold cathode tubes 18 and the brightness within the surface range of the optical member 16 are relatively high. When the cold cathode tubes 18 are arranged at large intervals, the distribution density of the cold cathode tubes 18 and the brightness within the surface range of the optical member 16 are relatively low. When the cold cathode tubes 18 are arranged at large intervals, the distance between the cold cathode tubes is short. Therefore, uneven brightness caused by differences in brightness in illumination areas where the cold cathode tubes 18 are arranged and non-illumination areas where the cold cathode tubes 18 are not arranged is less likely to be recognized. However, a larger number of the cold cathode tubes 18 are required for reducing the distance therebetween and thus a cost tends to increase. In FIG. 3, to distinguish the intervals between the cold cathode tubes 18 from one another, the intervals are marked with PT1 to PT6 in a sequence from the smallest one.

The intervals between the cold cathode tubes 18 are relatively small in the center area in which the support members 20 support the optical member 16 at the relatively low positions. The intervals between the cold cathode tubes 18 are relatively large in the edge areas in which the support members 20 support the optical member 16 at the relatively high positions. In this embodiment, the cold cathode tubes 18 are arranged at different intervals according to the support positions of the optical member 16. The intervals are set such that a ratio that is calculated by dividing the distance between each support position of the optical member 16 and the corresponding cold cathode tube 18 by the interval between the respective cold cathode tubes 18 is within a reference range. By setting the ratio equal to or higher than the lowest value of the reference range, uneven brightness is less likely to occur within the surface range of the optical member 16. By setting the ratio equal to or lower than the highest value in the reference range, the overall thickness of the backlight unit 12 can be reduced. Moreover, the number of the cold cathode tubes 18 can be reduced as low as possible.

The support members 20 are arranged in lines along the arrangement direction of the cold cathode tubes 18. Intervals between those support members 20 in the Y-axis direction in the center area are different from the intervals in the edge areas so as to correspond to the intervals between the cold cathode tubes 18. The intervals are large in the center area and small in the edge areas. The intervals between the support members 20 in the Y-axis direction become gradually smaller from the center area toward the edge areas and gradually larger from the edge areas toward the center area. The distribution density of the support pins 26 in the Y-axis direction is relatively high in the center area and relatively low in the edge areas. The interval between the support members 20 correspond to a distance between the centers of the support members 20 located adjacent to each other in the Y-axis direction, that is, a distance between the support pins 26 of the adjacent support members 20. The long dimension of the main body 24 of each support member 20 is different from one support member 20 to another according to the location in the area of the chassis 14. The long dimension of the main body 24 in the center area is smaller and that of the main bodies 24 in the edge areas is larger. The locations of the light-source holders 25 on each main body 24 are also different according to the location in the area of the chassis 14.

Effects of this embodiment having the above configuration will be explained. Under a normal temperature, the diffuser 21 is substantially flat along the X-Y plane as illustrated in FIGS. 6 to 9. The optical sheets 22 layered on the front surface of the diffuser 21 are also substantially flat. In this condition, predetermined gaps are provided between the rear surface of the diffuser 21 and the support pins 26 of the support members 20. As described above, the gap is larger around the center and smaller near the outer edges.

When the liquid crystal display device 10 is in use, the cold cathode tubes 18 in the backlight unit 12 are turned on and off and thus an internal temperature thereof changes. A temperature in an internal space of the backlight unit 12 is higher than a temperature in an external space because the backlight unite 12 includes a large number of the cold cathode tubes 18 as heat sources. Therefore, the temperature in a space behind the diffuser 21 is relatively high and that in a space in front of the diffuser 21 is relatively low. As a result, the diffuser 21 may be thermally expanded and warped. Because the gap is present between the diffuser 21 and the support pins 26 as described above, the warp of the diffuser 21 is allowed within the gap. The gap is large between the center area of the diffuser 21 and the support pins 26 and small between the edge areas of the diffuser 21 and the support pins 26. As illustrated in FIGS. 10 to 13, the warp of the diffuser 21 largely toward the cold cathode tubes 18 is allowed. Specifically, the diffuser 21 gently curves to form an arc-like shape (a bow-like shape) in two dimensions and a dome-like shape in three dimensions. The optical sheets 22 layered on the diffuser 21 are also warped in the same shape along the shape of the diffuser 21.

Figure 14:
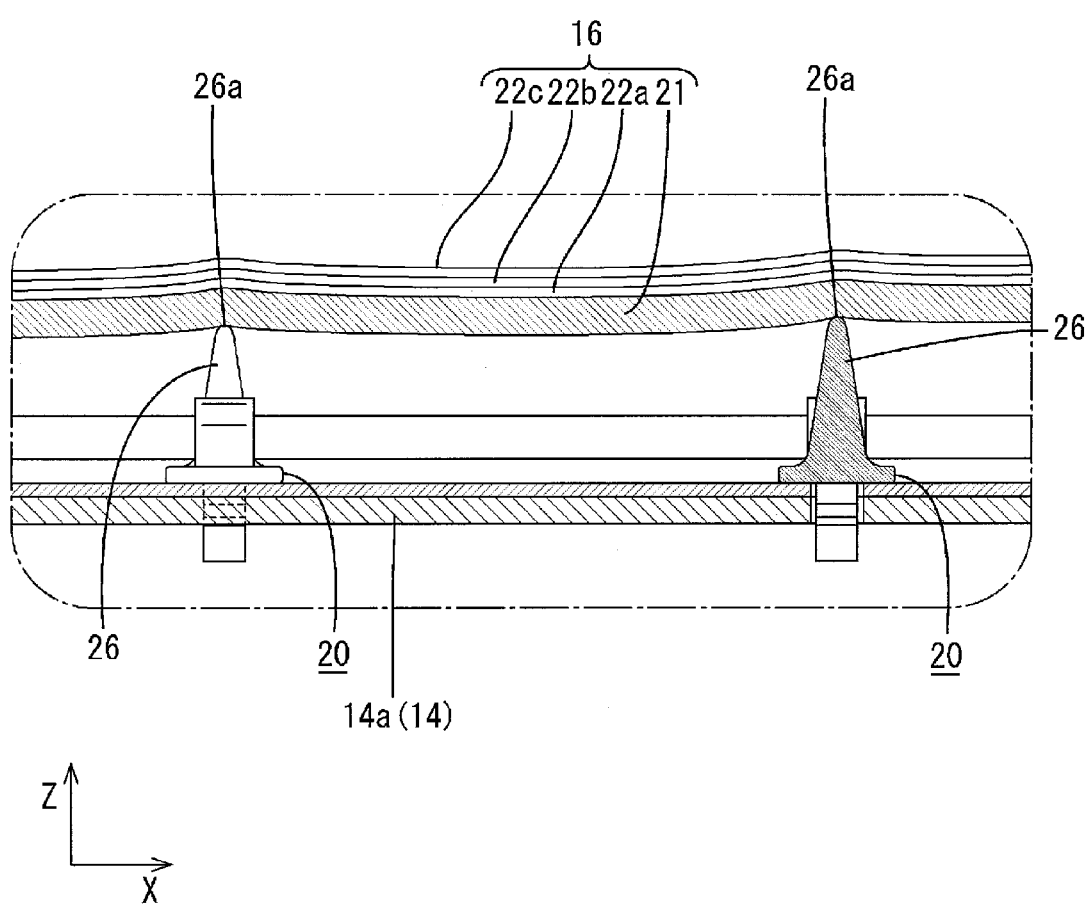
FIG. 14 is a magnified view of FIG. 12.

When the diffuser 21 is in contact with the tips 26a of the support pins 26, it cannot move further to the rear side, that is, closer to the cold cathode tubes 18. When the tips 26a of the support pins 26 are in contact with the diffuser 21, stresses may be applied to the support pins 26 and the diffuser 21. Because the diffuser 21 is largely warped in an early stage of the thermal expansion thereof, the stresses are very small. When the diffuser 21 is further thermally expanded from the state in which it is in contact with the tips 26a of the support pins 26, parts of the diffuser 21 may be deformed around the support pins 26 as illustrated in FIG. 14. Because the diffuser 21 is largely warped in an early stage of the thermal expansion thereof, the local deformations of the diffuser 21 are very small. The optical sheets 22 layered on the diffuser 21 are also largely warped in the similar shapes to that of the diffuser 21 in an early stage of the thermal expansion thereof. Therefore, local deformations of the optical sheets 22 are also very small. Among the optical sheets 22, the lens sheet 22b has optical anisotropic properties stronger than the others. If parts of the lens sheet 22bb are largely deformed, the distribution of exiting light within the surface range tends to become uneven. By reducing the local deformations of the lens sheet 22b, the uneven brightness can be effectively reduced. Linear light emitted from the cold cathode tubes 18 is converted to even planar light while it passes through the diffuser 21 and the optical sheets 22. The distributions of light within the surface ranges of the diffuser 21 and each optical sheet 22 are even. The even planar light is then directed toward the liquid crystal panel 11. Therefore, even when the optical member 16 is thermally expanded, the uneven brightness is less likely to occur.

As described earlier, the support positions of the center area of the diffuser 21 supported by the support members 20 are relatively low and thus the distances between the cold cathode tubes 18 and the optical member 16 are short. When the distances between the cold cathode tubes 18 and the optical member 16 are short, the lamp images tend to be easily recognized through the optical member 16. In this embodiment, the intervals between the cold cathode tubes 18 arranged parallel to each other in the Y-axis direction are relatively smaller around the center than near the edges. Namely, the distribution density of the cold cathode tubes 18 around the center is relatively high. Even when the distances between the cold cathode tubes 18 and the optical member 16 around the center decrease, the lamp images are less likely to be recognized. Therefore, even when the support positions of the optical member 16 supported by the support members 20 are set as low as possible, the uneven brightness is effectively reduced. Namely, by arranging the cold cathode tubes 18 in the above-described layout, the support positions of the optical member 16 supported by the support members 20 can be set lower than a limit. Therefore, the thicknesses of the backlight unit 12 and the liquid crystal display device 10 can be reduced.

As described above, the backlight unit 12 of this embodiment includes the chassis 14, the cold cathode tubes 18, the optical member 16 and the support members 20. The chassis 14 has an opening on the light exit side. The cold cathode tubes 18 are light sources arranged in the parallel layout and housed in the chassis 14. The optical member 16 is arranged on the light exit side outer than the cold cathode tubes 18 so as to cover the opening of the chassis 14. The support members 20 are arranged along the arrangement direction of the cold cathode tubes 18 in lines parallel to each other. The support members 20 support the optical member 16 from the opposite side from the light exit side. The support positions of the optical member 16 supported by the support members 20 around the center are relatively close to the cold cathode tubes 18. The support positions of the optical member 16 supported by the support members 20 near the edges are relatively farther from the cold cathode tubes 18. The intervals between the cold cathode tubes 18 are relatively smaller around the center and relatively larger near the edges.

The support positions of the optical member 16 supported by the support members 20 are relatively closer to the cold cathode tubes 18 around the center and relatively farther from the cold cathode tubes 18 near the edges. When the thermal environment changes, the optical member 16 may thermally expand. When the thermal expansion occurs, the optical member 16 is largely warped toward the cold cathode tubes 18. Therefore, stresses applied to the support points of the optical member 16 at which the optical member 16 is supported by the support members 20 can be reduced. The local deformations the optical member 16 around the support points at which the optical member 16 is supported by the support members 20 are less likely to occur and thus the uneven brightness is less likely to occur.

When the optical member 16 is warped toward the cold cathode tubes 18, the distances between the cold cathode tubes 18 and the optical member 16 around the center decrease. Therefore, the shadows of the cold cathode tubes 18 are less likely to be recognized through the optical member 16. The intervals between the cold cathode tubes 18 are relatively small around the center and the distribution density of the cold cathode tubes 18 is high around the center. Therefore, even when the distances between the optical member 16 and the cold cathode tubes 18 decrease, the shadows of the cold cathode tubes 18 are less likely to be recognized and thus the uneven brightness is less likely to occur. Because the support positions of the optical member 16 supported by the support members 20 are set as close as possible to the cold cathode tubes 18, the overall thickness can be reduced.

The cold cathode tubes 18 are arranged at intervals that gradually become larger from the center to the edges. Because the distribution density of the cold cathode tubes within the surface range of the optical member 16 gradually changes, the uneven brightness is further less likely to occur.

The support members 20 are formed such that the supporting positions of the optical member 16 gradually become farther from the cold cathode tubes 18 from the center to the edges. When the thermal expansion occurs, the optical member 16 is held in a gently curved shape. Therefore, the local deformations are less likely to occur in the optical member 16 and thus the uneven brightness is further less likely to occur.

The support members 20 are formed such that a line that connects the support positions of the optical member 16 forms an arc-like curve. With this configuration, the optical member 16 is held in a gently curved shape when it is thermally expanded.

The support members 20 are formed such that the points of the support of the optical member 16 can be set between the adjacent cold cathode tubes 18. With this configuration, light from the cold cathode tubes 18 is less likely to be blocked by the support members 20. This preferably reduces the uneven brightness.

Each support member 20 is formed such that the support point at which the optical member 16 is supported by the support member 20 can be set at the midpoint between the adjacent cold cathode tubes 18. With this configuration, the distance between the support point at which the optical member 16 is supported by the support member 20 and one of the adjacent cold cathode tubes 18 is substantially equal to the distance between the support point and the other cold cathode tube 18. With this configuration, the uneven brightness is further preferably reduced.

The support members 20 are arranged at relatively small intervals around the center and at relatively large intervals near the edges. When the optical member 16 is thermally expanded, larger stresses tend to be applied to the center area than the edge areas. Because a larger number of the support members 20 are arranged around the center, the stresses applied to the support members 20 can be reduced. Therefore, the optical member 16 is less likely to rub against the support members 20 at the points of the support, squeaks are less likely to be produced.

The optical member 16 includes a plurality of layers. Because the optical member 16 includes a plurality of the layers, the local deformations of the optical member 16 may produce serious negative optical effect. Therefore, the technology disclosed herein is effective.

The optical member 16 includes the diffuser 21 and the optical sheets 22. The diffuser 21 contains the light scattering members for scattering light. It is directly supported by the support members 20. The optical sheets 22 are layered on the light exit side of the diffuser 21. The optical sheets 22 includes at least lens sheet 22b having the light-collecting structure. The lens sheet 22b having the light-collecting structure tends to cause uneven brightness when local deformations thereof occur. Therefore, the technology disclosed herein is especially effective.

The light-collecting structure has anisotropic light-collecting properties. The light-collecting structure having anisotropic light-collecting properties tends to cause uneven brightness when local deformations occur in the lens sheet 22b. Therefore, the technology disclosed herein is especially effective.

The light-collecting structure includes a large number of the cylindrical lenses 22b2 arranged parallel to each other. The technology disclosed herein is effective for the light-collecting structure including the cylindrical lenses 22b2.

The light-collecting structure has the light-collecting direction and the non-light-collecting direction within the surface range of the lens sheet 22b. The lens sheet 22b has a rectangular shape, and the short-side direction thereof is aligned with the light-collecting direction. The lens sheet 22b having the rectangular shape thermally expands largely in the long-side direction than in the short-side direction. Because the short-side direction of the lens sheet 22b is aligned with the light-collecting direction, a dimension of the lens sheet 22b along the light-collecting direction is less likely to change even when thermal expansion occurs. Therefore, uneven brightness is less likely to occur.

The light-collecting structure has the light-collecting direction and the non-light-collecting direction within the surface range of the lens sheet 22b. The light-collecting direction is aligned with the vertical direction and the non-light-collecting direction is aligned with the horizontal direction. With this configuration, even when the thermal expansion occurs and local deformations occur in the leans sheet 22b around the support points, uneven brightness in the horizontal direction is less likely to occur.

Each cold cathode tube 18 has a linear shape that extends in one direction within the surface range of the optical member 16. The cold cathode tubes 18 are arranged parallel to each other in the direction perpendicular to the axial direction thereof. The support members 20 arranged parallel to each other along the arrangement direction of the cold cathode tubes 18 having the linear shapes. The optical member 16 is warped toward the cold cathode tubes 18 by the support members 20 and thus the uneven brightness is preferably reduced.

The optical member 16 includes the lens sheet 22b as the optical sheet 22 having the light-collecting structure. The light-collecting structure has the light-collecting direction and non-light-collecting direction within the surface range of the lens sheet 22b. The light-collecting direction is aligned with the arrangement direction of the cold cathode tubes 18 and the non-light-collecting direction is aligned with the axial direction of the cold cathode tube 18. Parts of the lens sheet 22b are less likely to be deformed in the arrangement direction of the cold cathode tubes 18, that is, the light-collecting direction of the lens sheet 22b. Therefore, the uneven brightness is effectively reduced.

The support members 20 are arranged in lines parallel to each other in the arrangement direction of the cold cathode tubes 18 and in lines parallel to the axial direction of the cold cathode tubes 18. The support members 20 arranged in lines parallel to the axial direction around the center support the optical member 16 at the positions relatively closer to the cold cathode tubes 18, and those near the edges support the optical member 16 at positions relatively farther from the cold cathode tubes 18. With this configuration, the optical member 16 is largely warped so as to form a dome-like shape. Therefore, the uneven brightness is further less likely to occur.

Each support member 20 includes the light-source holders 25 that hold the cold cathode tube 18. Namely, the support member 20 has a function to hold the cold cathode tube 18 having a linear shape.

The frame 17 that holds the outer edges of the optical member 16 is provided. When the outer edges of the optical member 16 are held by a holding member, deformations tend to occur mostly in the center area of the optical member 16 when the optical member thermally expands. Because the optical member 16 is warped toward the cold cathode tubes 18, stresses applied to the optical member 16 and the support members 20 can be reduced.

Second Embodiment

The second embodiment of the present invention will be explained with reference to FIGS. 15 and 16. This embodiment includes support members 20A arranged in a different layout. In this embodiment, similar parts to those in the first embodiment will be indicated by the same symbols followed by letter A. The same configurations, functions and effects will not be explained.

Figure 15:
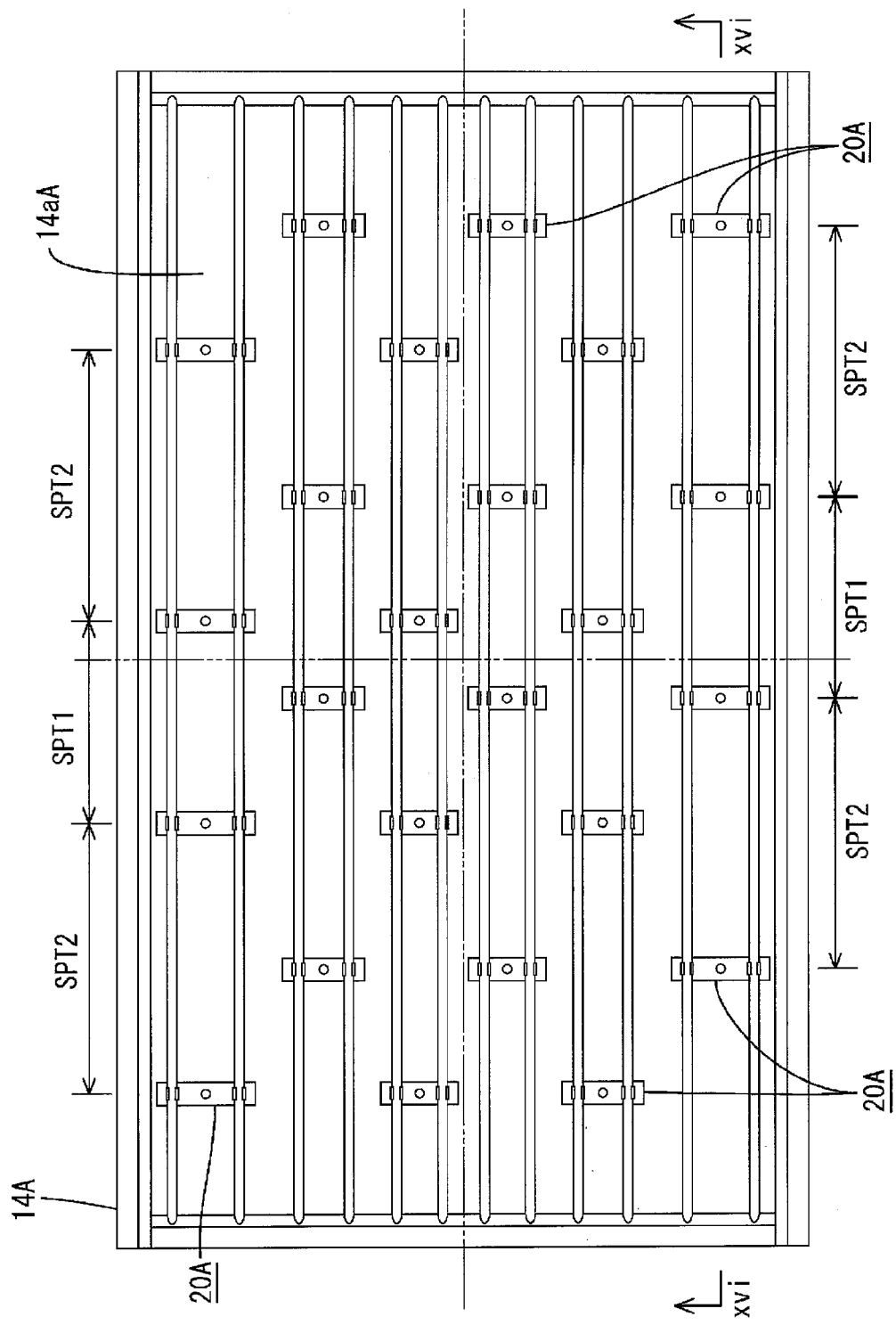
FIG. 15 is a plan view of a backlight unit according to the second embodiment of the present invention.
Figure 16:
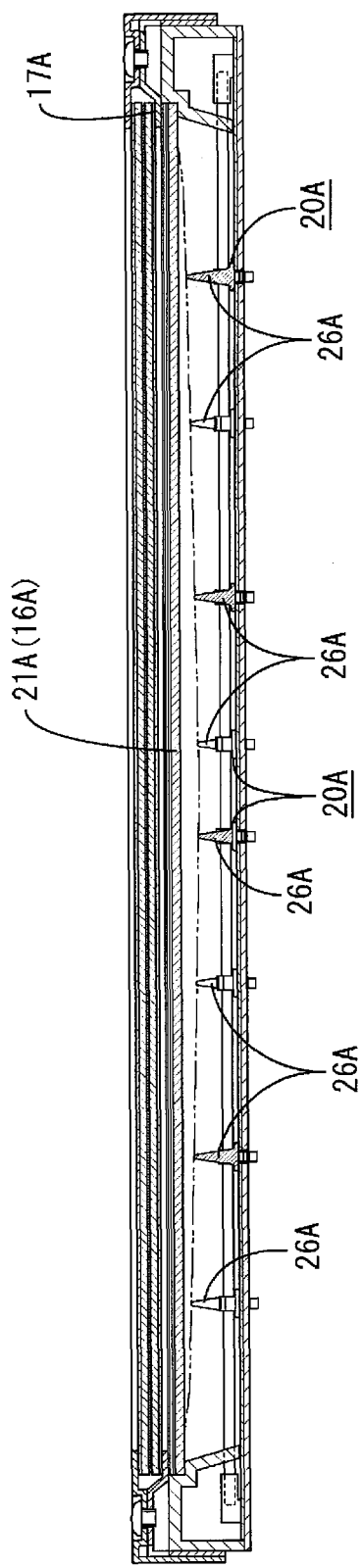
FIG. 16 is a cross-sectional view along line xvi-xvi in FIG. 15.

As illustrated in FIGS. 15 and 16, the support members 20A are arranged at relatively smaller intervals in the Y-axis direction (the short-side direction of a chassis 14A) around the center and at relatively larger intervals near the edges. Furthermore, the support members 20A are arranged at relatively smaller intervals SPT1 in the X-axis direction (a long-side direction of a bottom plate 14aA) around the center and relatively larger intervals SPT2 near the edges. The support members 20A are two-dimensionally arranged in a parallel layout within the surface ranges of the bottom plate 14aA and the optical member 16A. They are arranged at relatively smaller intervals around the center and relatively larger intervals near the edges. A distribution density of support pins 26A within the surface range of the optical member 16A is higher around the center than near the edges. Therefore, stresses applied to the support pins 26A that support the center area of the optical member 16A can be dispersed. The center area of the optical member 16A tends to change in size due to thermal expansion more than the outer edge portions that are held and restrained by the frame 17A. Namely, a large stress is more likely to be applied to the center area. By dispersing the stresses applied to the support pins 26A around the center, the support pins 26A are less likely to rub against the diffuser 21A due to the stresses, and squeaks are effectively reduced.

Third Embodiment

The third embodiment of the present invention will be explained with reference to FIGS. 17 and 18. In this embodiment, a backlight unit 12B is used differently. Furthermore, arrangements of cold cathode tubes 18B and support members 20B are different from the above embodiments. In this embodiment, similar parts to those in the first embodiment will be indicated by the same symbols followed by letter B. The same configurations, functions and effects will not be explained.

Figure 17:
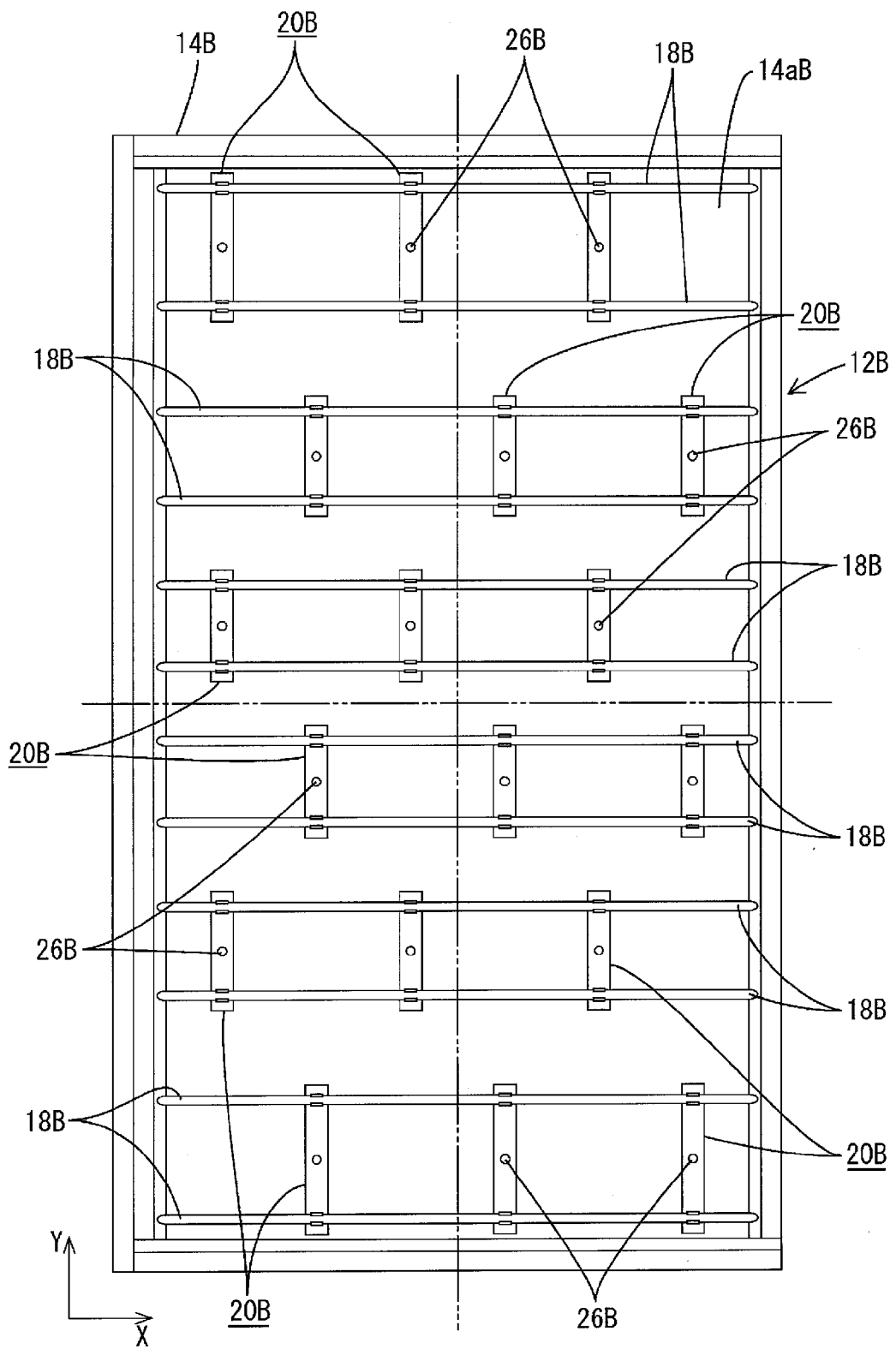
FIG. 17 is a plan view of a backlight unit according to the third embodiment of the present invention.

As illustrated in FIG. 17, the backlight unit 12B is used with a long-side direction and a short-side direction of the chassis 14B aligned with the vertical direction (the Y-axis direction) and the horizontal direction (the X-axis direction), respectively. Cold cathode tubes 18B housed in the chassis 14B are arranged with the axial direction thereof aligned with the short-side direction of the chassis 14B. Twelve cold cathode tubes 18B are arranged parallel to each other along the long-side direction of the chassis 14B. The cold cathode tubes 18B are arranged at small intervals around the middle of the long dimension of the chassis 14B. The intervals become larger toward the edges. Namely, the cold cathode tubes 18B are arranged at irregular intervals that gradually become larger. The support members 20B are arranged in a dispersed layout so as to form zigzag patterns within the surface range of the bottom plate 14aB of the chassis 14B. They are arranged in six lines along the short-side direction of the chassis 14B. Each line includes three support members 20B. They are arranged in eight lines along the long-side direction of the chassis 14B. Each line includes three support members 20B. The support members 20B are arranged at irregular intervals that gradually change similar to the cold cathode tubes 18B.

The optical member 16B having a rectangular shape tends to change its dimension due to thermal expansion or contraction largely in the long-side direction than the short-side direction. When the optical member 16B is thermally expanded and while being supported by the support pins 26B of the support members 20B, parts thereof around points of the support may be deformed. If the deformations occur, the amounts of deformations tend to be larger in the long-side direction than in the short-side direction. In this embodiment, the cold cathode tubes 18B having linear shapes are arranged parallel to each other along the long-side direction of the optical member 16B. Furthermore, the distribution density of the cold cathode tubes 18B is higher around the center. Even when the middle part of the long dimension of the optical member 16B is largely deformed, the uneven brightness is effectively reduced.

Figure 18:
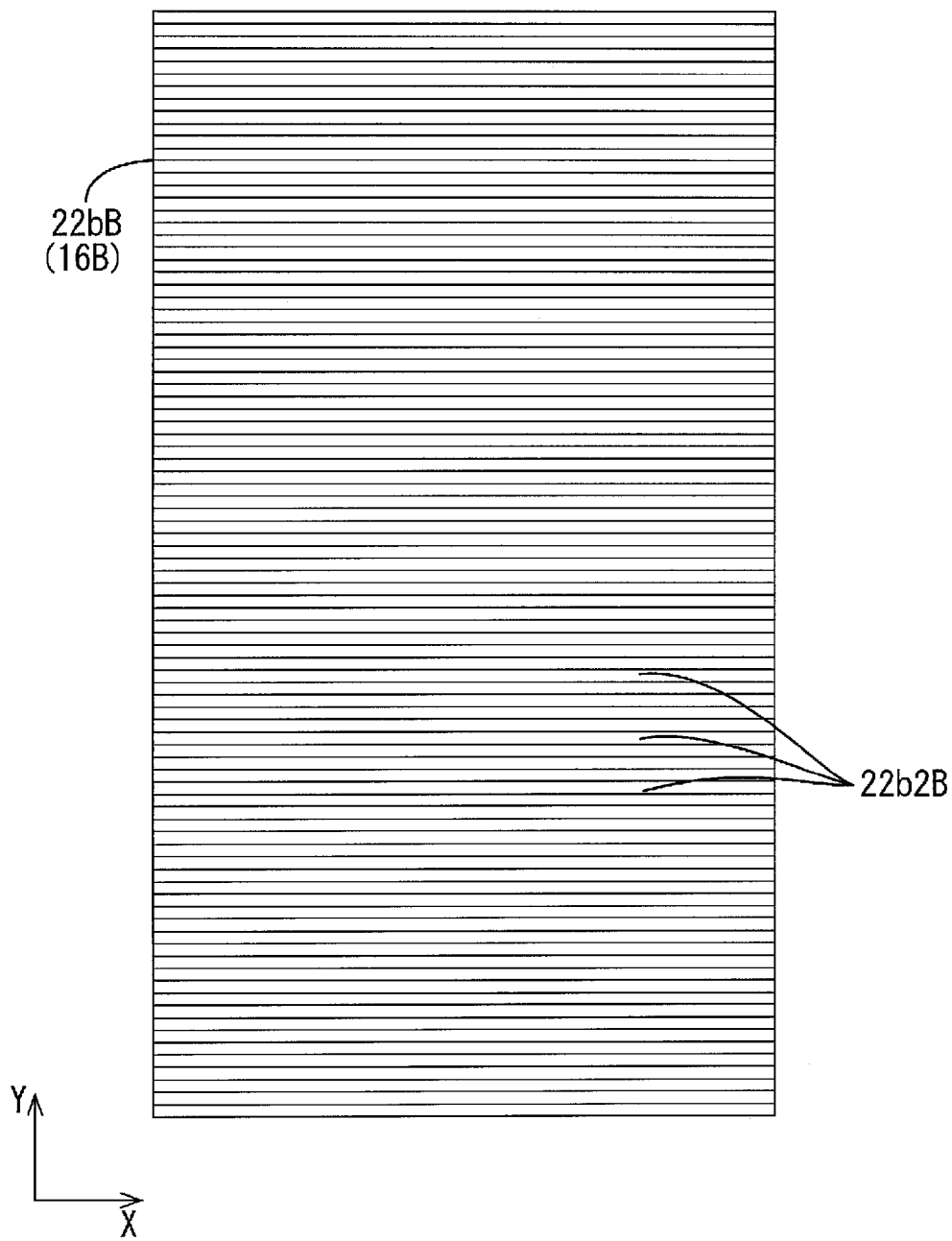
FIG. 18 is a plan view of a lens sheet.

As illustrated in FIG. 18, a lens sheet 22bB of the optical member 16B includes cylindrical lenses 22b2B that are provided as a light-collecting structure. The cylindrical lenses 22b2B are arranged with the axial directions thereof aligned with the short-side direction of the lens sheet 22bB (the axial direction of the cold cathode tube 18B). Namely, the lens sheet 22bB has a configuration in which the light-collecting direction thereof is aligned with the long-side direction and the non-light-collecting direction thereof is aligned with the short-side direction. The lens sheet 22bB tends to change the dimensions thereof due to the thermal expansion or contraction largely in the long-side direction than in the short-side direction. When the lens sheet 22bB is deformed in the long-side direction, the deformation may affect the light-collecting direction. The light-collecting direction may be different between the non-deformed area and the deformed area or between the different deformed areas. In this embodiment, the distribution density of the cold cathode tubes 18B is higher around the middle of the long dimension. Therefore, even when the light-collecting direction is slightly different from area to area, the uneven brightness is less likely to occur.

As described above, the light-collecting structure of the lens sheet 22bB of this embodiment has the light-collecting direction and non-light-collecting direction within the surface range. The lens sheet 22bB has a rectangular shape with the long-side direction thereof aligned with the light-collecting direction. The lens sheet 22bB having the rectangular shape tends to change its size due to thermal expansion largely in the long-side direction than the short-side direction. When the lens sheet 22bB is thermally expanded and the parts around the support points are deformed, the deformations tend to affect the light-collecting direction. Therefore, the technology disclosed herein is especially effective.

Fourth Embodiment

The fourth embodiment of the present invention will be explained with reference to FIGS. 19 to 23. In this embodiment, similar parts to those in the first embodiment will be indicated by the same symbols followed by letter C. The same configurations, functions and effects will not be explained.

Figure 19:
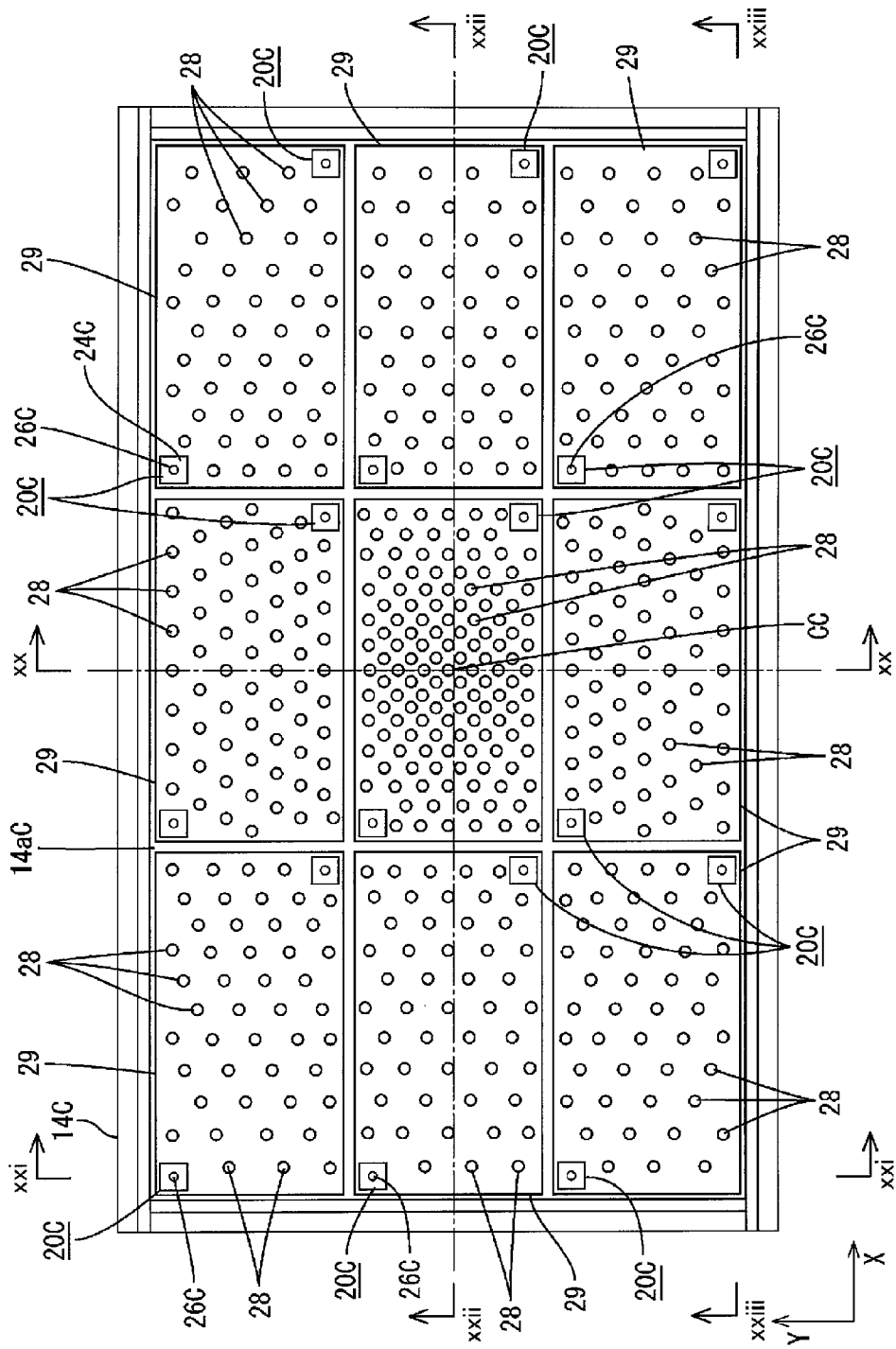
FIG. 19 is a plan view of a backlight unit according to the fourth embodiment of the present invention.
Figure 20:
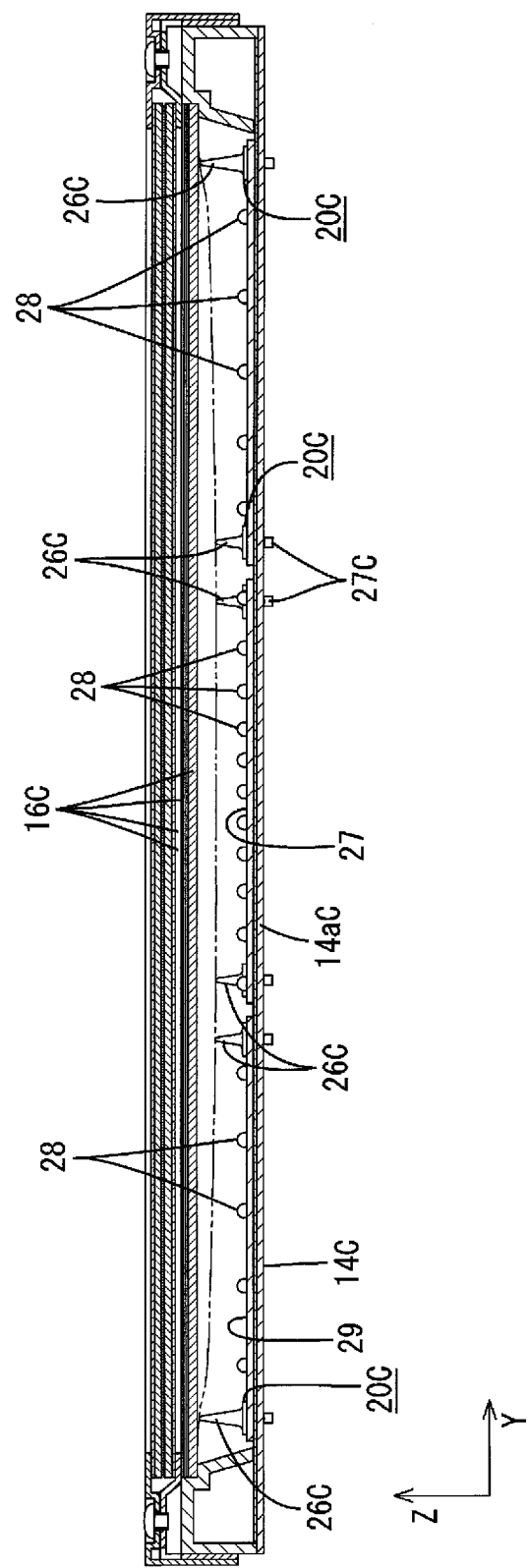
FIG. 20 is a cross-sectional view along line xx-xx in FIG. 19.
Figure 21:
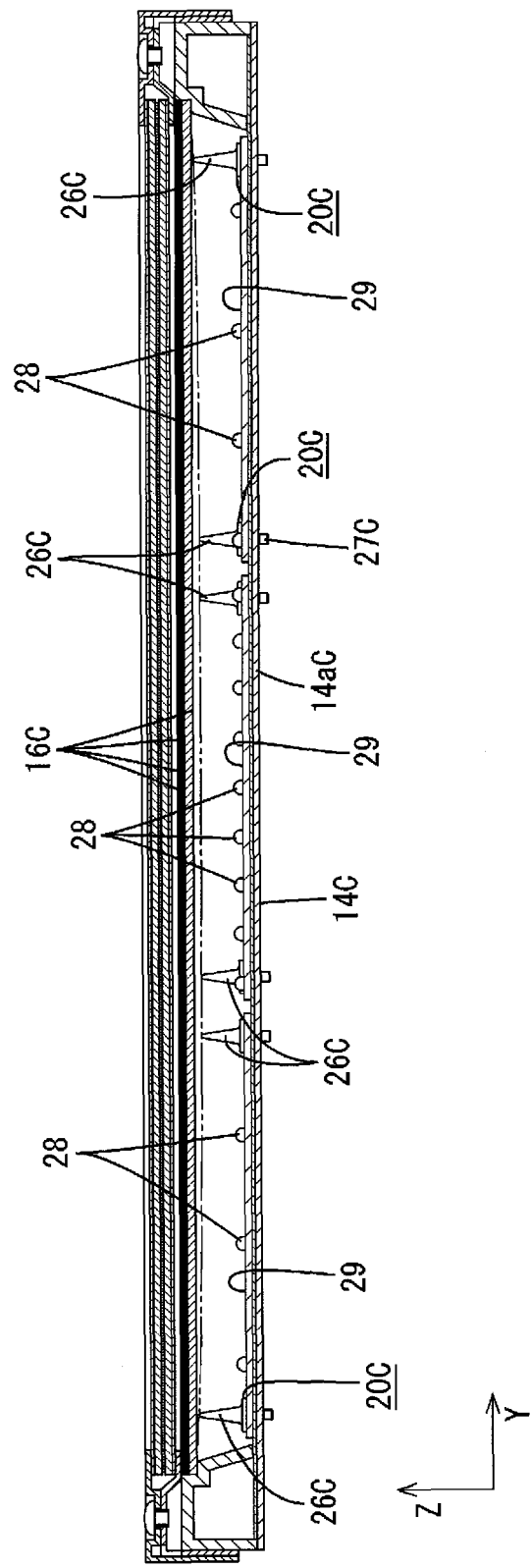
FIG. 21 is a cross-sectional view along line xxi-xxi in FIG. 19.
Figure 22:
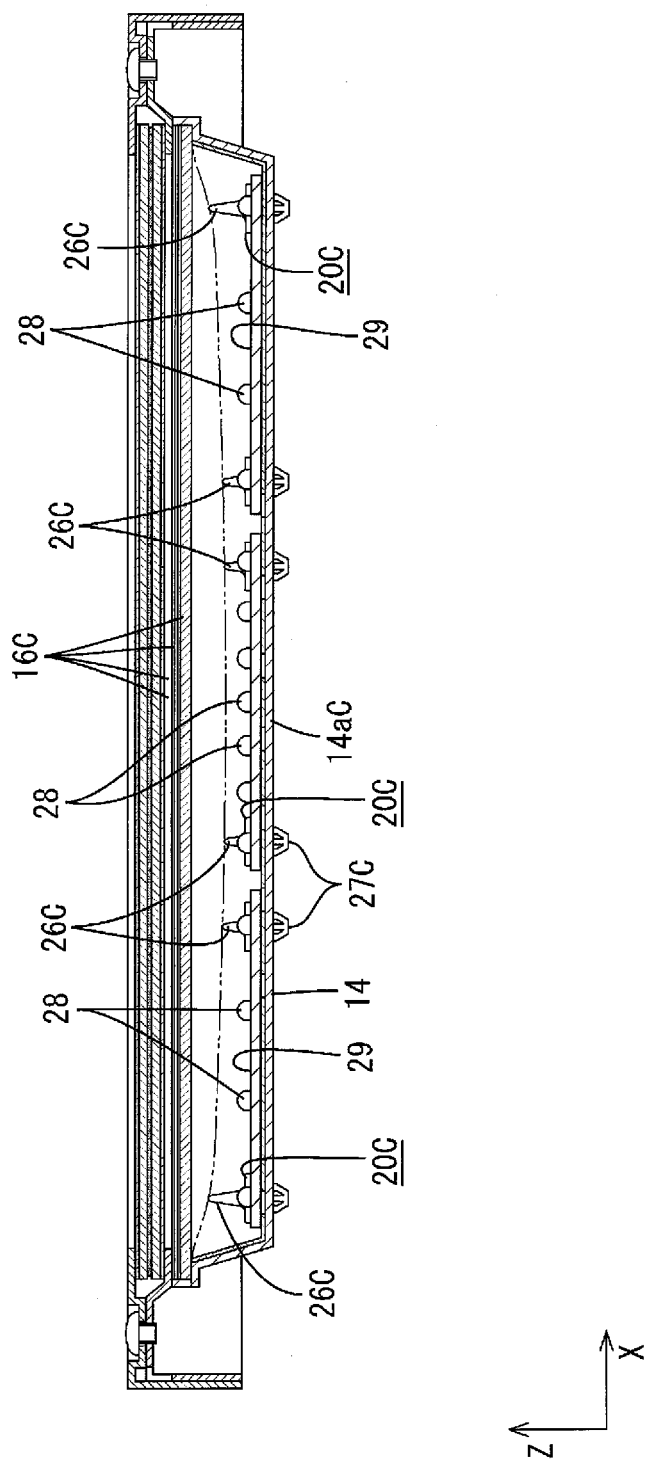
FIG. 22 is a cross-sectional view along line xxii-xxii in FIG. 19.
Figure 23:
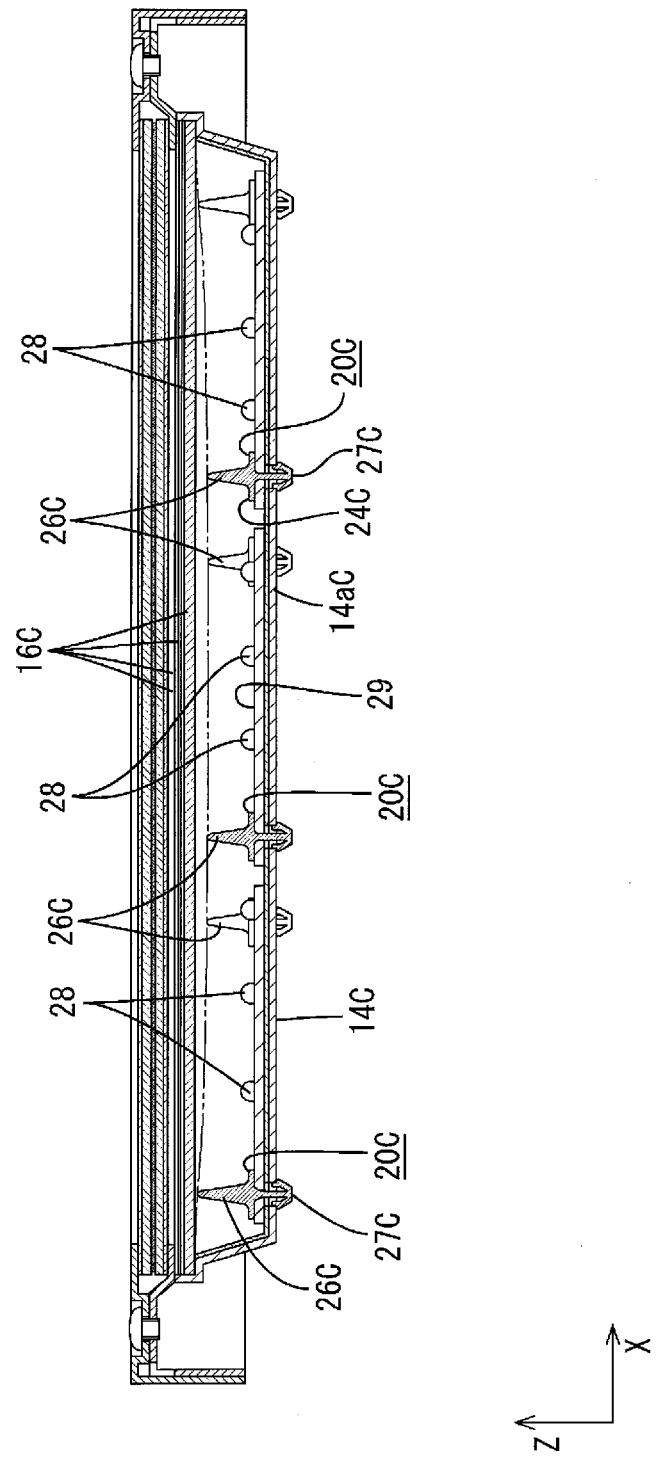
FIG. 23 is a cross-sectional view along line xxiii-xxiii in FIG. 19.

As illustrated in FIG. 19, a backlight unit 12C includes LEDs 28 (light emitting diodes) that are point light sources arranged within a surface range of an optical member 16C (within a light exit surface). Each LED 28 includes three LED chips (not shown) and is mounted on an LED board 29. Each LED chip emits a single color of red (R), green (G) or blue (B). Each LED 28 emits white light. The LED board 29 has a rectangular shape with the long side thereof aligned with the X-axis direction. Three by three LED boards 29 are arranged in a matrix within a chassis 14C along the X-axis direction and the Y-axis direction. A large number of the LEDs 28 are two-dimensionally arranged in a parallel layout within a bottom plate 14aC of the chassis 14C and the surface of the optical member 16C. The LEDs 28 are arranged at relatively smaller intervals around the center and at relatively larger intervals near outer edges. The intervals between the LEDs 28 gradually become larger from the center to the outer edges, and gradually become smaller from the outer edges to the center. A distribution density of the LEDs 28 within the bottom plate 14aC and the surface of the optical member 16C is higher around the center and lower near the outer edges.

Specifically, the LEDs 28 are arranged in a zigzag layout on each LED board 29 and the arrangement patterns thereof differ from each other according to locations of the LED boards 29 on the chassis 14C. The center of the center LED board 29 arranged at the center of the chassis 14C is aligned with the center CC of the chassis 14C. The intervals between the LEDs 28 mounted around the center of the LED board 29 are smaller and between the LEDs 28 near the outer edges of the LED board 29 are larger. The LEDs 28 mounted on the LED boards 29 arranged near the outer edges of the LED boards 29 that surround the center LED board 29 are arranged according to relative positions between the center CC of the chassis 14C and the LED boards 29. Specifically, the intervals between the LEDs 28 arranged near the outer edge closer to the center CC are smaller and between the LEDs 28 arranged near the outer edge away from the center CC are larger. Namely, the LEDs 28 are arranged radially from the center CC of the bottom plate 14a or the optical member 16, and the intervals are substantially proportional to the distances from the center CC of the bottom plate 14aC or the optical member 16C.

Next, support members 20C will be explained. In this embodiment, the LEDs 28 mounted on the LED boards 29 are used as light sources. Therefore, the support members 20C do not have light source holding functions. The support members 20C of this embodiment has a similar configuration to those of the support members 20 of the first to the third embodiments except for the light-source holders 25. Each support member 20C includes a main body 24C, a support pin 26C and a mounting part 27C. The main body 24C extends along the bottom plate 14aC of the chassis 14C. The support pin 26C protrudes from the front surface of the main body 24C. The mounting part 27C protrudes from the rear surface of the main body 24. Two support members 20C are arranged at diagonally opposite corners of each LED board 29. Namely, the support members 20C are two-dimensionally arranged in a parallel layout within the bottom plate 14aC of the chassis 14C and the surface of the optical member 16C. As illustrated in FIGS. 20 to 23, the support pints 26C that protrude from the main bodies 24C are relatively shorter around the center of the surface and relatively taller near the outer edges of the surface. Specifically, the heights of the support pins 26C gradually decrease from the center to the outer edges of the bottom plate 14aC or the optical member 16C, and gradually become lower from the outer edges to the centers. The heights change proportional to the distances from the center CC. The mounting parts 27C are passed through the LED boards 29 and inserted in mounting holes of the bottom plate 14aC of the chassis 14C. As a result, the support members 20C and the LED boards 29 are mounted to the chassis 14C and held in a proper mount condition.

The support positions of the optical member 16C supported by the support members 20C are relatively lower around the center, and the intervals between the LEDs 28 around the center are relatively smaller. The support positions of the optical member 16C supported by the support members 20C are relatively higher near the outer edges, and the intervals between the LEDs 28 are relatively larger. In this embodiment, the intervals between the LEDs 28 two-dimensionally change within the surface range of the optical member 16C according to the support positions of the optical member 16C supported by the support members 20C. The relationships between the support positions and the intervals between the LEDs 28 are optimized. Therefore, when the optical member 16C is warped in a dome-like shape that project toward the LEDs 29 due to thermal expansion and a distance between each LED 28 and the optical member 16C is different from one LED 28 to another, the uneven brightness is further effectively reduced within an entire surface of the optical member 16C.

In this embodiment, the LEDs 28 are used as point light sources arranged within the surface range of the optical member 16. The technology disclosed herein is preferable for a configuration including the LEDs 28 that are point light sources.

The LEDs 28 are two-dimensionally arranged in a parallel layout within the surface range of the optical member 16C. The intervals between the LEDs 28 are relatively smaller around the center and relatively larger near the outer edges. With this configuration, when the optical member 16C is thermally expanded and the distances between the center area of the optical member 16C and the LEDs 28 decrease, shadows of the LEDs 28 are further less likely to be recognized and the uneven brightness is further less likely to occur.

The support members 20 are two-dimensionally arranged in the parallel layout within the surface range of the optical member 16C. The support positions of the optical member 16C supported by the support members 20C are relatively closer to the LEDs 28 around the center and relatively farther from the LEDs 28 near the outer edges. With this configuration, the optical member 16C can be largely warped in a dome-like overall shape. Furthermore, the distribution density of the LEDs 28 that are point light sources is higher around the center and lower near the outer edges corresponding to the support positions of the optical member 16 supported by the support members 20C. Therefore, the uneven brightness is further effectively reduced.

OTHER EMBODIMENTS

The present invention is not limited to the above embodiments explained in the above description. The following embodiments may be included in the technical scope of the present invention, for example.

(1) In the above embodiments, the support positions of the optical member supported by the support members are set so as to gradually become higher from the center to the edges. However, the support positions of the optical member supported by the support members may be set so as to become higher stepwise from the center to the edges.

(2) In the first to the third embodiments, the support positions of the optical member supported by the support members arranged along the arrangement direction of the cold cathode tubes are set at different levels. Moreover, the support positions of the optical member supported by the support members arranged along the axial direction of the cold cathode tubes are also set at different levels. However, the support positions of the optical member supported by the support members arranged along the axial direction of the cold cathode tubes may be set at the same level. In that case, the support positions of the optical member by the support member around the center in the arrangement direction of the cold cathode tubes are set at the lowest level. Therefore, the local deformations of the optical member can be reduced. Moreover, the distribution density of the cold cathode tubes is the highest around the center. Therefore, the uneven brightness is less likely to occur.

(3) In the first and the second embodiments, the support members having the light-source holders are used. However, the support members without the light-support holders as in the fourth embodiment may be used. Both of the support members with the light-source holders and the support members without the light-source holders may be used.

(4) In the above embodiments, the support members are two-dimensionally arranged in the parallel layout within the surface range of the chassis. However, the support members may be arranged in lines that extend in one direction. As a modification of the first to the third embodiments, the support members may be arranged along the arrangement direction of the cold cathode tubes and not along the axial direction of the cold cathode tubes. As a modification of the fourth embodiment, the support members may be arranged only along the X-axis direction or the Y-axis direction.

(5) In the above embodiments, the support members are regularly arranged in a matrix within the surface range of the chassis. However, the support members may be irregularly arranged within the surface range of the chassis.

(6) In the above embodiments, the support pins that support the optical member at the highest support positions (the farthest from the light sources) are not in contact with the rear surface of the diffuser that is substantially flat under the normal temperature. However, the support pins that support the optical member at the highest support positions may be in contact with the rear surface of the diffuser that is substantially flat under the normal temperature.

(7) In the first to the third embodiments, each support pin is arranged at the midpoint between the adjacent cold cathode tubes. However, each support pin may be arranged off the midpoint between the cold cathode tubes.

(8) In the above embodiments, each support pin is arranged between the adjacent light sources. However, each support pin may be arranged immediately above the light source, that is, the support pin and the light source overlap each other in plan view.

(9) The locations of the support members on the chassis or the number of the support members can be altered from those in the above embodiments as necessary. Shapes of the support pins or the number of the support pins on each main body may be altered as necessary. Shapes or the number of the light support holders of the support members in the first to the third embodiments can be also altered as necessary.

(10) In the above embodiments, the insertion-type mounting parts are used as mounting structures for mounting the support members to the chassis. However, slide-type mounting parts may be used as mounting structures. Such a slide-type mounting part may have a hook-like shape. A hook-like portion of the mounting part is hooked to the edge of the mounting hole by pressing the main body against the bottom plate of the chassis and then sliding along the bottom plate.

(11) In the above embodiments, the intervals between the light sources (the cold cathode tubes or the LEDs) gradually become larger from the center to the edges. However, the intervals between the light sources may become larger stepwise.

(12) In the first to the third embodiments, the length of each cold cathode tube is substantially equal to one of the sides of the chassis. However, the length of the cold cathode tube may be shorter than the sides of the chassis and the cold cathode tubes may be two-dimensionally arranged within the surface range of the chassis. In that case, the intervals between the cold cathode tubes may be smaller around the center and larger near the outer edges, that is, two-dimensionally different intervals, similar to the fourth embodiment.

(13) In the first to the third embodiments, the rubber holders are attached to the ends of the cold cathode tubes. However, the present invention may be applied to a backlight unit including ferrules or outer leads provided at the ends of the cold cathode tubes. In the backlight unit, power is supplied from the inverter board to the cold cathode tubes via the ferrules or the outer leads that are in contact with terminals of connectors arranged on the chassis.

(14) In the first to the third embodiments, the cold cathode tubes that are one kind of fluorescent tubes are used. However, other types of fluorescent tubes including hot cathode tubes can be used.

(15) In the first to the third embodiments, the cold cathode tubes that are one kind of fluorescent tubes are used as linear light sources. However, discharge tubes including mercury lamps and xenon lamps other than fluorescent tubes can be used. Furthermore, as an example of linear light sources, a large number of LEDs may be dispersedly arranged on peripheries of base members having a rod-like shape.

(16) In the fourth embodiment, the LEDs are used as point light sources. However, other kinds of point light sources can be used.

(17) In the above embodiments, either the linear light sources or the point light sources are used. However, both linear light sources and point light sources may be used.

(18) In the above embodiments, the linear light sources or the point light sources are used. However, a plurality of planar light sources may be arranged in a parallel layout.

(19) In the above embodiments, the optical member is substantially flat under the normal temperature. However, an optical member that is warped toward the light sources under the normal temperature may be used. In that case, the tips of the support pins may be in contact with the diffuser before thermal expansion occurs.

Figure 24:
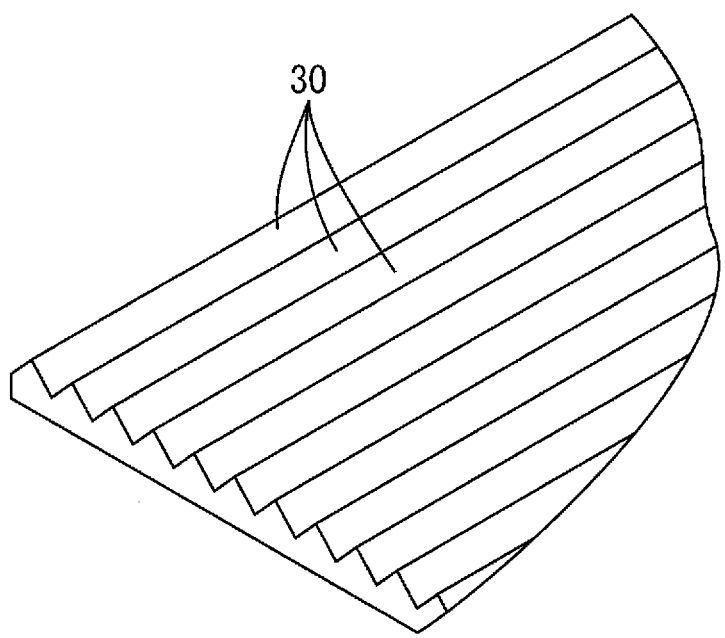
FIG. 24 is a magnified perspective view of a lens sheet according to other embodiments (20) of the present invention.

(20) In the above embodiments, the cylindrical lenses having convex light exit surfaces are used as the light-collecting structure of the lens sheet. The light-collecting structure can be altered as necessary. For example, lenses 30 illustrated in FIG. 24 may be used. Each lens 30 has a triangular cross section and a pair of light exit surfaces. Furthermore, lenses 31 illustrated in FIG. 25 may be used. Each lens 31 has a dome-like shape. The lenses 31 are two-dimensionally arranged in a parallel layout.

(21) In the above embodiments, the lens sheet including the cylindrical lenses as the light-collecting structure is used. However, a microlens sheet including microlenses as a light-collecting structure can be used. Furthermore, a diffusing sheet including a large number of diffusing members arranged on a surface of a base member can be used.

(22) A different kind of an optical member having a light-collecting structure from those in the above embodiments can be used as necessary. For example, an optical member having the following configuration may be used. A lens sheet having lenticular lenses and a diffuser are layered. An air layer is provided between a light-collecting area of the lenticular lenses and the diffuser. A reflection layer is provided between a non-light-collecting area of the lenticular lenses and the diffuser.

(23) In the first to the third embodiments, the axial direction of the cylindrical lenses of the lens sheet is aligned with the axial direction of the cold cathode tubes. However, the axial direction of the cylindrical lenses may be perpendicular to the axial direction of the cold cathode tubes.

Figure 25:
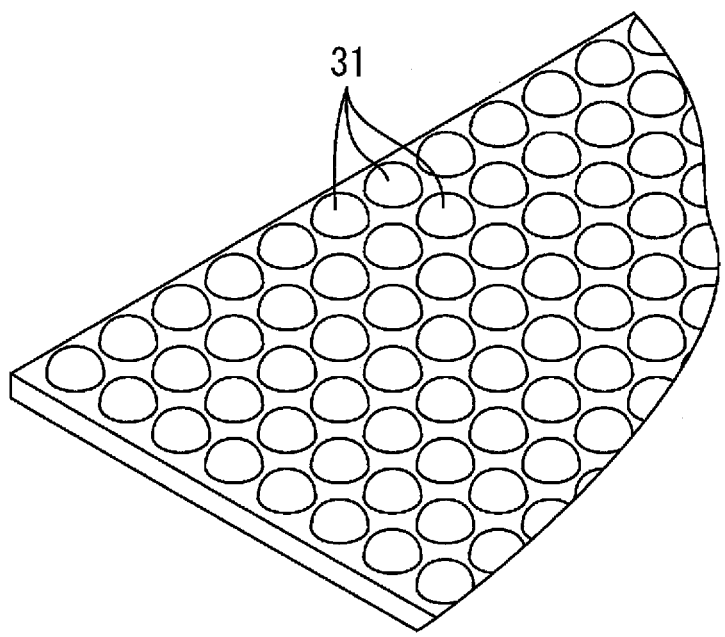
FIG. 25 is a magnified perspective view of a lens sheet according to other embodiments (20) of the present invention.

(24) In the above embodiments, the lens sheet including the light-collecting structure having anisotropic light-collecting properties. However, an optical member including a light-collecting structure without anisotropic light-collecting properties can be used. An example of the optical sheet, the light-collecting structure of which does not have the anisotropic light-collecting properties, is illustrated in FIG. 25. The dome-like lenses are two-dimensionally arranged in a parallel layout. Another example of such an optical sheet includes a diffuser in which a large number of diffusing members are arranged on a surface of a base member.

(25) In the above embodiments, the lens sheet having the light-collecting structure is used. However, an optical member without the light-collecting structure may be used.

(26) The number of the layers or the kinds of the optical member can be altered from those in the above embodiments as necessary.

(27) In the above embodiments, the TFTs are used as switching components of the liquid crystal display device. However, the technology described herein can be applied to liquid crystal display devices using switching components other than TFTs (e.g., thin film diodes (TFDs)). Furthermore, it can be applied to white-and-black liquid crystal display devices other than the color liquid crystal display device.

(28) In the above embodiments, the liquid crystal display device including the liquid crystal panel as a display component is used. However, the present invention can be applied to display devices including other types of display components.

(29) In the above embodiments, the television receiver including the tuner is used. However, the technology can be applied to a display device without the tuner.

The invention claimed is:

1. A lighting device comprising:
a chassis having an opening on a light exit side;
a plurality of light sources arranged in a parallel layout and housed in the chassis;
an optical member arranged on a light exit side outer than the light sources so as to cover the opening of the chassis; and
a plurality of support members arranged in a parallel layout along at least a parallel arrangement direction of the light sources, each of the support members holding the optical member from a side opposite from the light exit side, wherein:
the support members are arranged such that support positions of the optical member are relatively closer to the light sources around a center and relatively farther from the light sources near edges; and
the light sources are arranged at relatively smaller intervals around the center and at relatively larger intervals near the edges.

2. The lighting device according to claim 1, wherein the intervals between the light sources become gradually larger from the center to the edges.

3. The lighting device according to claim 1, wherein the support members are formed such that the support positions of the optical member are located gradually farther from the light sources from the center to the edges.

4. The lighting device according to claim 3, wherein the support members are formed such that a line that connects the support positions of the optical member forms an arc-like shape.

5. The lighting device according to claim 1, wherein the support members are formed such that each of support points of the optical member is located between the adjacent light sources.

6. The lighting device according to claim 5, wherein the support members are formed such that each of the support points of the optical member is located at a midpoint between the adjacent light sources.

7. The lighting device according to claim 1, the support members are arranged at relatively smaller intervals around the center and at relatively larger intervals near the edges.

8. The lighting device according to claim 1, wherein the optical member includes a plurality of layers.

9. The lighting device according to claim 8, wherein:
the optical member includes a diffuser and an optical sheet, the diffuser including a diffusing member configured to diffuse light and being directly supported by the support members, the optical sheet being layered on the light exit side of the diffuser and including at least a light-collecting structure.

10. The lighting device according to claim 9, wherein the light-collecting structure has an anisotropic property.

11. The lighting device according to claim 10, wherein the light-collecting structure includes a plurality of cylindrical lenses arranged in a parallel layout.

12. The lighting device according to claim 10, wherein:
the light-collecting structure has a light-collecting direction and non-light-collecting direction within a surface range of the optical sheet; and
the optical sheet has a rectangular shape with a long-side direction thereof aligned with the light-collecting direction.

13. The lighting device according to claim 10, wherein:
the light-collecting structure has a light-collecting direction and non-light-collecting direction within a surface range of the optical sheet; and
the optical sheet has a rectangular shape with a short-side direction thereof aligned with the light-collecting direction.

14. The lighting device according to claim 10, wherein:
the light-collecting structure has a light-collecting direction and non-light-collecting direction within a surface range of the optical sheet; and
the light-collecting direction is aligned with a vertical direction and the non-light-collecting direction is aligned with the horizontal direction.

15. The lighting device according to claim 1, wherein the light sources extend linearly in one direction within the surface range of the optical member and are arranged in the parallel arrangement along a direction perpendicular to an axial direction thereof.

16. The lighting device according to claim 15, wherein:
the optical member includes an optical sheet having a light-collecting structure, the light-collecting structure having a light-collecting direction and a non-light-collecting direction; and
the light-collecting direction is aligned with the parallel arrangement of the light sources and the non-light-collecting direction is aligned with the axial direction of the light sources.

17. The lighting device according to claim 15, wherein:
a plurality of the support members are arranged in a parallel layout along the parallel arrangement direction of the light sources and a plurality of the support members are arranged in a parallel layout along the axial direction of the light sources; and
the support members arranged in a parallel layout along the axial direction are formed such that the support positions of the optical member around the center are relatively closer to the light sources and those near the edges are relatively farther from the light sources.

18. The lighting device according to claim 15, wherein the support members include light-source holders that hold the light sources.

19. The lighting device according to claim 15, wherein the light sources are fluorescent tubes.

20. The lighting device according to claim 19, wherein the light sources are cold cathode tubes.

21. The lighting device according to claim 1, wherein the light sources are point light sources arranged within a surface range of the optical member.

22. The lighting device according to claim 21, wherein the light sources are two-dimensionally arranged in a parallel layout within the surface range of the optical member at relatively smaller intervals around the center and at relatively larger intervals near outer edges.

23. The lighting device according to claim 22, the support members are two-dimensionally arranged in a parallel layout within the surface range of the optical member and formed such that the support positions of the optical member are relatively closer to the light sources around the center and relatively farther from the light sources near the outer edges.

24. The lighting device according to claim 21, wherein the light sources are light emitting diodes.

25. The lighting device according to claim 1, further comprising holding members holding outer edges of the optical member.

26. A display device, comprising:
the lighting device according to claim 1; and
a display panel arranged configured to provide display using light from the lighting device.

27. The display device according to claim 26, wherein the display panel is a liquid crystal panel including liquid crystals sealed between substrates.

28. A television receiver comprising the display device according to claim 26.

* * * * *